(12) United States Patent
Suzuki et al.

(10) Patent No.: US 7,378,186 B2
(45) Date of Patent: May 27, 2008

(54) FLAT NON-AQUEOUS ELECTROLYTE SECONDARY CELL

(75) Inventors: Masami Suzuki, Kawasaki (JP);
Muneto Hayami, Takasaki (JP); Kazuo Udagawa, Tokyo (JP); Kazuo Iizuka, Takasaki (JP); Naomi Ishihara, Annaka (JP); Satoshi Hirahara, Annaka (JP); Hirotaka Sakai, Gunma-ken (JP); Kiyoto Yoda, Kawasaki (JP); Masataka Shikota, Yokohama (JP)

(73) Assignee: Toshiba Battery Co., Ltd., Tokyo (JP)

( * ) Notice: Subject to any disclaimer, the term of this patent is extended or adjusted under 35 U.S.C. 154(b) by 779 days.

(21) Appl. No.: 10/318,177

(22) Filed: Dec. 13, 2002

(65) Prior Publication Data
US 2003/0138693 A1     Jul. 24, 2003

Related U.S. Application Data

(62) Division of application No. 09/641,267, filed on Aug. 17, 2000, now Pat. No. 6,521,373.

(30) Foreign Application Priority Data

| Aug. 27, 1999 | (JP) | ................................. 11-240964 |
| Aug. 27, 1999 | (JP) | ................................. 11-241290 |
| Nov. 18, 1999 | (JP) | ................................. 11-327679 |
| Jun. 19, 2000 | (JP) | ............................ 2000-183000 |
| Jun. 19, 2000 | (JP) | ............................ 2000-183001 |

(51) Int. Cl.
*H01M 2/02* (2006.01)
*H01M 2/08* (2006.01)
*H01M 4/58* (2006.01)
*H01M 10/40* (2006.01)
*H01M 4/66* (2006.01)

(52) U.S. Cl. ...................... 429/162; 429/127; 429/124; 429/185; 429/231.8; 429/181; 429/330; 429/176; 429/94; 429/245; 429/332

(58) Field of Classification Search ............... 429/128, 429/149, 152, 153, 162, 171, 174, 185, 127, 429/124
See application file for complete search history.

(56) References Cited

U.S. PATENT DOCUMENTS 2,971,999 A    2/1961   Jacquier

| 4,356,240 | A | | 10/1982 | Dey et al. |
| 4,830,940 | A | * | 5/1989 | Keister et al. ................. 429/94 |
| 5,707,756 | A | | 1/1998 | Inoue et al. |
| 6,312,848 | B1 | * | 11/2001 | Kilb et al. ................... 429/162 |
| 6,617,074 | B1 | * | 9/2003 | Watarai et al. ......... 429/231.95 |
| 6,638,662 | B2 | * | 10/2003 | Kaneda et al. ........... 429/231.8 |

FOREIGN PATENT DOCUMENTS

| EP | 1 011 163 A | | 6/2000 |
| JP | 08-031394 | * | 2/1996 |
| JP | 10-255733 | * | 9/1998 |
| JP | 10-289707 | * | 10/1998 |
| JP | 2000-164259 | * | 6/2000 |

* cited by examiner

*Primary Examiner*—Patrick Joseph Ryan
*Assistant Examiner*—Angela J. Martin
(74) *Attorney, Agent, or Firm*—Oblon, Spivak, McClelland, Maier & Neustadt, P.C.

(57) ABSTRACT

In a flat non-aqueous electrolyte secondary cell comprising an electricity-generating element including at least a cathode, a separator and an anode and a non-aqueous electrolyte in the inside of a cathode case, a plurality of electrode units each consisting of the cathode and the anode opposite to each another via the separator are laminated to form an electrode group, or an electrode unit in a sheet form consisting of the cathode and the anode opposite to each another via the separator is wound to form an electrode group, or a sheet-shape cathode is wrapped with the separator except for a part contacting at inner face of cathode case and a sheet-shaped anode is set on the sheet-shaped cathode in a right angled position each other and then these cathode and anode are bent alternately to form an electrode group, and the total sum of the areas of the opposing cathode and anode in this electrode group is larger than the area of the opening of an insulating gasket in a sealed portion in the cathode case or than the area of an opening in a sealed plate in a sealed portion in the cathode case, whereby the discharge capacity upon heavy-loading discharge is significantly increased as compared with the conventional cells. Accordingly, while the size of the cell is small, the discharge capacity is increased as described above, and thus it is possible to provide a highly utilizable flat non-aqueous electrolyte secondary cell. Further, in said flat non-aqueous electrolyte secondary cell, problems which may be caused by the increased discharge capacity in the cell can be solved by improving the solvent and supporting electrolyte for the electrolyte or by various improvements in the cathode and anode cases.

13 Claims, 13 Drawing Sheets

FLAT NON-AQUEOUS ELECTROLYTE SECONDARY CELL

BACKGROUND OF THE INVENTION

1. Field of the Invention

The present invention relates to a flat non-aqueous electrolyte secondary cell and in particular to a flat non-aqueous electrolyte secondary cell with improvements in heavy loading discharge characteristics.

2. Description of the Prior Art

In recent years, there are commercially available coin- or button-shaped flat non-aqueous electrolyte secondary cells wherein metal oxides such as $MnO_2$ and $V_2O_5$, inorganic compounds such as fluorinated graphite, or organic compounds such as polyanline and polyacene structural compounds are used as the cathode active material, while metal lithium or lithium alloys, organic compounds such as polyacene structural compounds, carbon materials capable of occluding and releasing lithium, or oxides such as lithium titanate or lithium-containing silicon oxides are used in the anode, and non-aqueous electrolytes containing a supporting electrolyte such as $LiClO_4$, $LiPF_6$, $LiBF_4$, $LiCF_3SO_3$, $LiN(CF_3SO_2)_2$ and $LiN(C_2F_5SO_2)_2$ dissolved in a non-aqueous solvent such as propylene carbonate, ethylene carbonate, butylene carbonate, diethyl carbonate, dimethyl carbonate, methyl ethyl carbonate, dimethoxyethane and γ-butyl lactone are used as the electrolyte. These cells are used as power sources for backing up SRAM and RTC where an electric current is discharged for light loading of about several to dozens μA, or as main power sources for wristwatches not requiring cell exchange.

In general, these coin- or button-shaped flat non-aqueous electrolyte secondary cells have the structure shown in FIG. 4. That is, a metallic anode case 5 also serving as an anode terminal and a metallic cathode case 1 also serving as a cathode terminal are fit to each other via an insulating gasket 6, and further the cathode case 1 has a sealed opening structure caulked by caulking, and in the inside of this structure, tablet-shaped cathode 12 and anode 14 having a smaller diameter than the opening of the insulating gasket 6 are set up against each other via a single- or multi-ply separator 13 impregnated with a non-aqueous electrolyte.

The coin- or button-shaped flat non-aqueous electrolyte secondary cells as described above have the advantage that they are easily producible, excellent in mass-productivity, and superior in long-term reliability and safety. Further, by virtue of their simple structure, the most distinctive feature of these cells is that their miniaturization is feasible.

Meanwhile, the miniaturization of devices (mainly compact information terminals) such as portable telephones and PDA is promoted, thus making it essential to miniaturize secondary cells as their main power sources. In these power sources, there have been used cylindrical or rectangular alkali secondary cells such as lithium ion secondary cells wherein lithium-containing oxides such as lithium cobaltate is used as the cathode active material while a carbon material is used in the anode, or nickel hydride secondary cells wherein nickel oxyhydroxide is used as the cathode active material and a hydrogen-occluding alloy is used as the anode active material. These cells have been constructed by coating or filling a current-collecting body consisting of a metal foil or metal net with an active material layer to form an electrode, then welding a tab terminal into the center of the electrode, and winding or laminating it to form an electrode group, complicatedly bending the tab terminal from the center of the electrode group and welding the terminal into a safety element, an opening-sealed pin or a cell can. However, these cells have been constructed in such a complicated process that they are inferior in workability and the miniaturization of parts therein is also difficult. Further, these cells should be provided therein with a space for preventing the tab terminal from short-circuiting or for integrating a large number of parts such as safety element into the cells, and thus there is a limit to the miniaturization of these cells at present.

For miniaturization of the cells under these circumstances, the present inventors have attempted not at miniaturizing cylindrical or rectangular lithium ion secondary cells or nickel hydride secondary cells, but at achieving a higher output of the flat non-aqueous electrolyte secondary cells described above. That is, the present inventors have used lithium cobaltate of high capacity and high potential as the cathode active material and a graphitized carbon material of high capacity excellent in voltage evenness as the anode active material, and according to the process and structure of the conventional flat non-aqueous electrolyte secondary cell, the inventors have processed the cathode and anode into tablets smaller than a gasket, to prepare a cell.

However, this cell though attaining superior characteristics to the conventional flat non-aqueous electrolyte secondary cell is not satisfactory when discharged in a large current required of a main power source in compact portable devices, thus failing to achieve levels satisfactory as a main power source in compact portable devices. Accordingly, the development of techniques for permitting the heavy-loading discharge characteristics of the compact flat non-aqueous secondary cell to reach levels not achieved in the prior art is necessary.

SUMMARY OF THE INVENTION

This invention was made in view of the circumstances described above, and the object of this invention is to provide a flat non-aqueous electrolyte secondary cell, which is remarkably superior in heavy-loading discharge characteristics.

The present inventors made extensive study on the improvement of the heavy-loading discharge characteristics of the flat non-aqueous electrolyte secondary cell described above. As a result, they found that the heavy-loading discharge characteristics are significantly improved by allowing the area of the electrodes to be significantly larger than in the conventional flat non-aqueous electrolyte secondary cell, to arrive at the present invention.

That is, the present invention relates to a flat non-aqueous electrolyte secondary cell comprising a metallic anode case also serving as an anode terminal and a metallic cathode case also serving as a cathode terminal fit to each other via an insulating gasket, the anode or cathode case having an opening-sealed structure caulked by caulking and having in the inside thereof an electricity-generating element including at least a cathode, a separator and an anode and a non-aqueous electrolyte, wherein a plurality of electrode units each consisting of the cathode and the anode opposite to each another via the separator are laminated to form an electrode group, or a sheet-shaped electrode unit consisting of the cathode and the anode opposite to each another via the separator is wound to form an electrode group, or a sheet-shape cathode is wrapped with the separator except for a part contacting at inner face of cathode case and a sheet-shaped anode is set on the sheet-shaped cathode in a right angled position each other and then these cathode and anode are bent alternately to form an electrode group, and the total sum of the areas of the opposing cathode and anode in this electrode group is larger than the area of the opening of said insulating gasket.

Further, the present invention relates to a flat non-aqueous electrolyte secondary cell comprising a metallic cell case also serving as an electrode terminal, an opening-sealing plate for sealing an opening in said cell case, and another electrode terminal arranged via an insulator in an opening provided in a part of the opening-sealing plate, said cell case being provided inside with an electricity-generating element including at least a cathode, a separator and an anode and a non-aqueous electrolyte, wherein an electrode group consisting of an electrode unit having the cathode and the anode opposite to each another via the separator is formed, and the total sum of the areas of the opposing cathode and anode in this electrode group is larger than the area of the opening of said opening-sealing plate.

As the forms where the total sum of the areas of the opposing cathode and anode in the electrode group is larger than the area of the opening of the insulating gasket in the present invention as described above, there is the form (1) wherein a plurality of the above-described electrode units are laminated to form an electrode group, and the total sum of the areas of the opposing cathodes and anodes in this electrode group is larger than the area of the opening of the insulating gasket, or the form (2) wherein the above electrode units are in the form of a sheet, and said sheet-formed electrode units are wound to form an electrode group, and the total sum of the areas of the opposing cathodes and anodes in this electrode group is larger than the area of the opening of the insulating gasket, or the form (3) wherein a sheet-shape cathode is wrapped with the separator except for a part contacting at inner face of cathode case and a sheet-shaped anode is set on the sheet-shaped cathode in a right angled position each other and then these cathode and anode are bent alternately to form an electrode group, and the total sum of the areas of the opposing cathodes and anodes in this electrode group is larger than the area of the opening of the insulating gasket.

As described above, the total sum of the areas of the opposing cathodes and anodes in the electrode group is made larger than the area of the opening of the insulating gasket or the opening-sealed plate, whereby the heavy-loading discharge characteristics of the flat non-aqueous electrolyte secondary cell can be significantly improved.

DETAILED DESCRIPTION OF THE INVENTION

Figure 1:
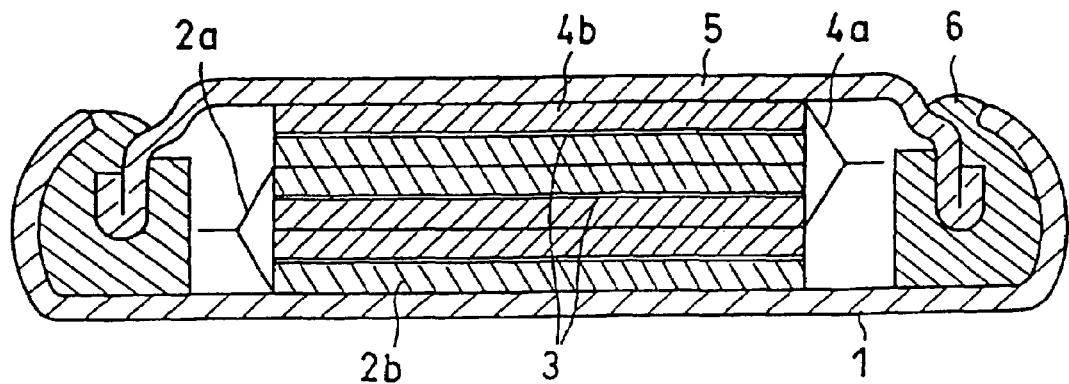
FIG. 1. Non-aqueous electrolyte secondary cell.

To improve the heavy-loading discharge characteristics, it is considered effective to increase the area of the electrodes. In the conventional flat non-aqueous electrolyte secondary cell, however, a cathode and an anode, both in a tablet form, are accommodated respectively to contact with an insulating gasket in the cell, so that the area of the cathode and anode opposing to each other via a separator will inevitably be smaller than the area of the opening of the insulating gasket. Even if the area of the opposing electrodes can be enlarged to some degrees by thinning the gasket, the opposing electrodes having a larger area than the area of the opening of the gasket can theoretically not be accommodated in the cell.

Accordingly, the present inventors have solved this problem from a different viewpoint from the prior art by laminating electrode units each consisting of a cathode, an anode and a separator, or by winding an electrode unit, or by bending alternately the sheet-shaped cathode and the sheet-shaped anode settled in a right angled position each other, in a cell case for the very small coin- or button-shaped flat cell, to permit the total sum of the areas of the opposing cathode(s) and anode(s) in the electrode group to be larger than the area of the opening of the insulating gasket.

In the conventional cylindrical or rectangular large secondary cells described above, there are cases where dozens electrode layers are accommodated in one cell, but such cells have the complicated structure as described above, so it is difficult to apply the electrode structure of such cells to the coin- or button-shaped, compact flat non-aqueous electrolyte secondary cell. Even if such a structure can be successfully applied, the advantages of the flat non-aqueous electrolyte secondary cell, for example miniaturizablility and high productivity, cannot be maintained. Accordingly, there has been no study attempting at permitting an electrode group whose opposing cathode and anode have a larger area than the area of the opening of an insulating gasket to be accommodated in the coin- or button-shaped, compact flat non-aqueous electrolyte secondary cell.

In the coin- or button-shaped, compact flat non-aqueous electrolyte secondary cell in the present invention, the electrode group is constituted as shown above in (1), (2) and (3) thereby maximizing the area of the electrodes and minimizing the number of parts, thus succeeding in accommodating the electrode group and an amount of the non-aqueous electrolyte necessary for discharge in the space of the compact cell. Further, the electrodes can be easily produced according to this accommodation method and thus are suitable for mass-production by virtue of superiority in productivity and production costs.

When the electrode units are laminated to form the electrode group in the present invention, the number of faces where a cathode is opposite an anode in the electrode unit is preferably at least 3. Cathode and anode plates, each provided with an electrically connecting portion at a part (terminal) thereof, are arranged as the electrodes such that they are opposite to each another via a separator, wherein the electrically connecting portion of each cathode plate is exposed in one direction of the separator, while the electrically connecting portion of each anode plate is exposed in the opposite direction of the separator, and thereafter the electrodes are laminated such that the electrically connecting portions of the cathodes are exposed to and electrically connected at the same side, while the electrically connecting portions of the anodes are exposed to and electrically connected at the opposite side. By arranging the electrically connecting portions of the cathodes opposite the electrically connecting portions of the anodes, internal short-circuiting upon contact between the cathode and anode electrically connecting portions can be prevented even in the coin- or button-shaped, compact flat non-aqueous electrolyte secondary cell.

Now, the method of connecting the electrode group to a metal case is described.

In the cylindrical or rectangular, relatively large lithium ion secondary cell as described above, a tab terminal is welded for current collection into the center of the electrode group or into a core of the wound electrode group, then bend and welded into a safety element or an opening-sealed pin. However, the technique of bending processing is complicated and thus inferior in productivity, and further the cell should be provided therein with a space for preventing internal short-circuiting, or an insulating plate should be inserted between the electrode group and the tab terminal. Furthermore, if stress is applied to the part where the tab terminal was welded into the electrode, the separator may be broken and the electrode may be deformed, thus making it necessary to protect the tab terminal by an insulating tape or to provide the wound core with a space. Accordingly, the method of current collection for the cylindrical or rectangular lithium ion secondary cells cannot be applied to the coin-shaped or button-shaped, flat non-aqueous electrolyte secondary cells having a small internal volume.

Accordingly, the present inventors have secured current collection for the electrode group and the cell case by exposing an electrically conductive constituent material of the cathode at one edge face of the laminated electrode group (face parallel to the flat plane of the flat cell) while exposing an electrically conductive constituent material of the anode at the other edge face and then bringing the respective exposed electrode constituent materials into contact with the cathode and anode cell cases, respectively. According to this method, the discharge capacity can be increased without providing any space or insulating plate between the electrode group and the cell case. In addition, because no short-circuiting occurs between the cell case or the electrode and the tab terminal, the cell is superior in safety and reliability.

Further, the area of contact between the electrode constitutional material and the cell case can be made significantly larger than the area of contact between the conventional tab terminal and the cell case, to achieve stable current collection, and the conventionally inevitable operation of welding the tab terminal into the electrode case can be omitted.

As a matter of course, the good electrical contact between the electrode constitutional material and the cell case, achieved in the method of collecting current in the present invention, can be further improved by welding the electrode constitutional material into the cell case or by fixing these members via a conductive adhesive or via a current collecting net between the electrode constitutional material and the cell case.

When the electrode unit is wound to form the electrode group in the present invention, the face where the cathode is opposite the anode in the electrode unit may be in either the parallel or perpendicular direction to the flat plane of the flat cell, preferably the parallel direction. This is because the structure for securing current collection is made by exposing a conductive constituent material of the cathode at one terminal of the electrode group while exposing the conductive constituent material of the anode at the other terminal and then bringing-each material into contact with the cell case.

In the case of the wound electrode group, the method of collecting current involves exposing an electrically conductive constituent material of the cathode at one edge face of the electrode group (face parallel to the flat plane of the flat cell) while exposing an electrically conductive constituent material of the anode at the other edge face and then bringing the respective exposed electrode constituent materials into contact with the cathode and anode cell cases, respectively. According to this structure, the discharge capacity can be increased without providing any space or insulating plate between the electrode group and the cell case. In addition, because no short-circuiting occurs between the cell case or the electrode and the tab terminal, the cell is superior in safety and reliability.

Figure 2:
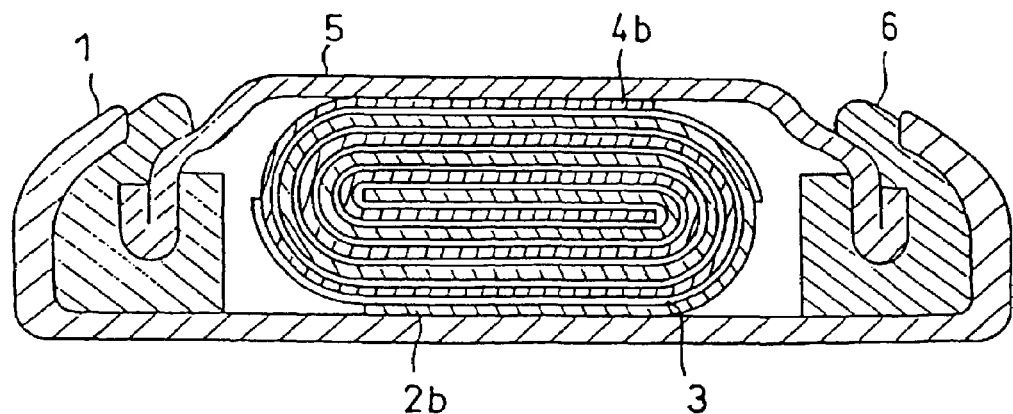
FIG. 2. Non-aqueous electrolyte secondary cell with cathode and anode in sheet form, sectional view of present invention.

A large number of systems can be used for winding the electrode group. In a preferable system, the cathode and the anode, both in a sheet form, are wound to be opposite to each other via a separator as shown in FIG. 2. According to this winding system, the electrode from the start to the end of winding can be efficiently used. Further, there is no space in the center of a core of the wound electrodes, so that when a spiral form of the flat electrodes is used, the electrodes can be effectively utilizable because both the electrodes are opposite to each other from the start of winding.

The wound electrode group may be used as such, but after being wound, it is preferably compressed to improve adhesion of the cathode via the separator to the anode. In the coin- or button-shaped, flat non-aqueous electrolyte secondary cell whose internal volume is small, if there is no space in the center of a core of the wound electrodes, the electrodes can be additionally accommodated therein, and further the adhesion of the cathode via the separator to the anode can be improved. The flat electrodes in a spiral form, constructed by bending and winding the opposing electrodes such that the face where the cathode is opposite the anode is parallel to the flat plane of the flat cell, followed by compressing the electrodes, have the advantage that they are firmly wound and excellent in adhesion. Furthermore the above advantage is obtained by sticking any tapes on R part of side of electrode group.

Furthermore, in the flat cell having such an opening-sealed structure as in the present invention, stress was applied in the perpendicular direction to the flat plane of the cathode and anode cases upon caulking of the cell case, whereby the adhesion between the electrode group and the cell case is improved, charge/discharge can be conducted smoothly, and the characteristics of the cell are improved. The exposed portions of the electrode constituent materials of the electrode group may contact the electrode case directly or electrically indirectly via a metal foil, a metal net, metal powder, carbon fillers or a conductive coating.

Now, the electrodes are described. For both the cathode and anode, it is possible to use a conventional method of forming a granular depolarizing mix for cell or a method of filling a metal substrate such as metal net or foamed nickel with a depolarizing mix for cell. Preferably, a depolarizing mix for cell in a slurry form is applied onto a metal foil, then dried and optionally further rolled so that a thin electrode can be easily prepared. If the electrodes on which the depolarizing mix for cell containing the active material is applied on a metal foil as described above are used, it is preferable for volume efficiency that the inner electrodes in the electrode group are those wherein a layer of the active material is formed on both sides of the metal foil, while the outermost electrodes in the electrode group, that is, the electrodes in contact with the cell case, are preferably those wherein particularly the metal foil in the electrode materials is exposed in order to reduce contact resistance. In this case, the active material layer may be formed on only one side of the outermost electrode, or after the active material later is formed on both sides of the outermost electrode, the active material layer may be removed from one side.

Now, the cathode and anode active materials used in the cell of the present invention are described.

In the present invention, special attention is paid to the structure of the cell including the electrodes, so there is no limit to the cathode active materials. It is possible to use metal oxides such as $MnO_2$, $V_2O_5$, $Nb_2O_5$, $LiTi_2O_4$, $Li_4Ti_5O_{12}$, $LiFe_2O_4$, lithium cobaltate, lithium nickelate and lithium manganate, inorganic compounds such as fluorinated graphite and $FeS_2$, and organic compounds such as polyaniline or polyacene structural compounds. Among these materials, lithium cobaltate, lithium nickelate, lithium manganate and a mixture thereof, or lithium-containing oxides where such elements are partially replaced by other metal elements are more preferable because of high working potential and excellent cycle characteristics, and in the flat non-aqueous electrolyte secondary cell which may be used for a prolonged period of time, lithium cobaltate is most preferable because of high capacity, low reactivity with an electrolyte or water, and chemical stability.

The anode active materials are not particularly limited neither, and it is possible to use metal lithium, lithium alloys such as Li—Al, Li—In, Li—Sn, Li—Si, Li—Ge, Li—Bi and Li—Pb, organic compounds such as polyacene structural compounds, carbon materials capable of occluding and releasing lithium, oxides such as $Nb_2O_5$, $LiTi_2O_4$, $Li_4Ti_5O_{12}$, Li-containing silicon oxides and Li-containing tin oxides, and nitrides such as $Li_3N$. Carbon materials capable of occluding and releasing lithium Li are preferable in respect of excellent cycle characteristics, low working potential and high capacity. Particularly, carbon materials having a developed graphite structure wherein the distance of the face $d_{002}$ is 0.338 nm or less, for example natural graphite, artificial graphite, expanded graphite, calcinated mesophase pitch and calcinated mesophase pitch fiber are preferable in respect of less reduction in the working voltage of the cell in the end of discharge.

In the flat non-aqueous electrolyte secondary cell having an electrode group in a laminate, wound or bent form as described above, the degree of adhesion between the cathode and anode cell cases and the electrode group has a significant influence on cell impedance and cell performance. For example, when the cell is stored for a long time in a high-temperature atmosphere at about 60° C., the non-aqueous electrolyte is decomposed, the cell is expanded, the adhesion between the cell case and the electrode group is significantly worsened, and the performance of the cell is deteriorated. In addition, when the flat non-aqueous electrolyte secondary cell is placed in an abnormal state such as short-circuiting, the cell causes a significant increase in temperature, resulting in decomposition of the non-aqueous electrolyte or gasification of the solvent thereby increasing the inner pressure in the cell to cause the problem of cell breakage.

This problem was solved in the present invention by using ethylene carbonate (EC) and γ-butyrolactone (GBL) as the major solvent for the non-aqueous electrolyte and lithium borofluoride as the supporting electrolyte. By this constitution, gas generation can be suppressed even at high temperature to prevent cell breakage.

A mixed solvent of EC and GBL is stable to a graphitized carbon anode and hardly decomposed at the side of the anode. Further, the stability of the mixed solvent at high potential is also high, and even if left for a long time in a high-temperature atmosphere, the non-aqueous electrolyte is hardly decomposed at the side of the cathode, thus hardly generating gas. Further, both EC and GBL have high boiling points (about 240° C. and about 200° C., respectively) so that even if the cell is heated upon short-circuiting or placed in an abnormal atmosphere at about 150° C., the vapor pressure of the mixed solvent can be kept low, and its decomposition hardly occurs. Accordingly, the increase in the inner pressure in the cell and the breakage of the cell can be prevented.

In the mixed solvent of EC and GBL, the volume ratio of EC to GBL is preferably 0.3 to 1.0. This is because if the volume ratio of EC is too low, a protective coating is not sufficiently formed on the surface of the carbon material constituting the anode during charge and discharge, to cause deterioration in cycle characteristics. On the other hand, if the volume ratio of EC is too high, lithium ion is hardly transferred in a low-temperature atmosphere to cause deterioration in low-temperature characteristics.

Lithium borofluoride is used as the supporting electrolyte for the following reason. As the supporting electrolyte, $LiBF_4$, lithium phosphate hexafluoride ($LiPF_6$), lithium perchlorate ($LiClO_4$), lithium trifluoromethane sulfonate ($LiCF_3SO_3$) are used generally used, but lithium borofluoride ($LiBF_4$) is preferably used for compatibility with a graphitized carbon anode, stability at high potential and stability in a high-temperature atmosphere. For example, when the graphitized carbon anode is used as the anode active material and the mixed solvent of EC and GBL is used as the solvent for non-aqueous electrolyte, use of $LiPF_6$ and $LiClO_4$ causes slight decomposition of the solvent on the anode and is thus not preferable. Use of $LiCF_3SO_3$ is not preferable either, because its electric conductivity is low and the resulting cell is poor in desired heavy loading discharge characteristics. On the other hand, $LiBF_4$ though being slightly inferior to $LiPF_6$ and $LiClO_4$ in heavy loading discharge characteristics is preferably used because decomposition of the solvent can be prevented, and by adding $LiBF_4$ at a concentration of 1.3 mol/l to 1.8 mold which is higher than a usual concentration of 0.5 mol/l to 1.0 mol/l, the resulting cell has improved heavy loading characteristics, to achieve the same heavy loading characteristics as by $LiPF_6$ and $LiClO_4$.

In the conventional lithium ion secondary cell using a lithium cobaltate-containing oxide as the cathode active material and a carbon material as the anode, the material contained in the cathode member is dissolved in the electrolyte and precipitated on the surface of the anode during long-term storage, to cause the problem of increased internal resistance. To solve this problem, ferrite-based stainless steel containing chromium and molybdenum (JP-A 63-124358), austenite-based stainless steel containing chromium and molybdenum (JP-A 6-111849) and ferrite-based stainless steel containing molybdenum with an increased amount of chromium (JP-A 2-126554) have been proposed as cathode case materials. However, in the non-aqueous electrolyte cells having a cell voltage of 4 V or more, the cathode member even using such stainless steel cannot be completely prevented from being dissolved during storage.

To solve this problem, the present invention comprises use of stainless steel comprising 0.1 to 0.3% niobium, 0.1 to 0.3% titanium and 0.05 to 0.15% aluminum contained in ferrite-based stainless steel containing 28.50 to 32.00% chromium and 1.50 to 2.50% molybdenum in the cathode case or as a member constituting a metallic part brought directly into contact with the cathode active material. Further, this invention comprises use of stainless steel comprising 0.8 to 0.9% niobium, 0.05 to 0.15% titanium and 0.20 to 0.30% copper contained in ferrite-based stainless steel containing 20.00 to 23.00% chromium and 1.50 to 2.50% molybdenum. By use of such stainless steel, the cathode member can be prevented from being dissolved during long-term storage.

When these flat non-aqueous electrolyte secondary cells are integrated in devices, lead terminals are often welded by resistance welding into cathode and anode cases and then attached via a solder to a device. In this case, the above-described flat non-aqueous electrolyte secondary cell, the electrode group comprises a cathode and an anode as thin as 1 mm or less and a polyethylene or polypropylene thin film separator of 0.5 mm or less laminated or wound therein, where the cathode and anode are brought directly into contact with cathode and anode cases respectively. Accordingly, if a voltage of about 500 V is applied across the cell cases, the heat generated upon welding is transmitted through the cell cases to reach the electrodes and separator to cause shrinkage or generate holes in the separator, resulting in deterioration in the capacity and short-circuiting in the cell. In addition, the voltage is directed to the welded portion, so that the electrode connected to the welded portion is removed from the current-collecting body, thus causing deterioration in the functions of the cell. This problem is solved when welding power is lowered, but because of poor welding strength, there arises another problem of the removal of lead terminals or the poor contact between the cell and lead terminals. Even if the lead terminals are welded by laser welding, heat evolution cannot be prevented and similar problems may be caused.

To prevent such problems, a metal net may be provided between the cathode case or the anode case and the electrode group. By doing so, heat generated upon welding of the lead terminals can be dissipated thereby preventing breakage of the electrodes and separator in the cell case.

To prevent the problems described above, there also is a method of arranging a non-metallic thermal insulator between the cathode case or the anode case and the thin-film separator. By doing so, the transmission of heat generated upon welding of the lead terminals to the electrode group in the cell can be blocked so that the breakage of the electrodes and separator in the cell can be prevented. To install this thermal insulator, it is preferable that the current-collecting body which in the electrode group, is brought into contact with the cell case is formed in a "U" shape, and said thermal insulator is kept in this U-shaped current-collecting body. According to this method, the object can be achieved without making the structure complicated.

Preferably, the metal net is shaped to form a space in the cell case in order to incorporate an electrolyte into the space. The metal net includes e.g. a metal net, expanded metal, punched metal and foam. The electrolyte in this space also works for dissipating heat and voltage. There is no particular limit to the shape of the current-collecting body and the form of the opening thereof.

With respect to the thickness of the metal net, this thickness plus the thickness of the can used is important. As their thickness is reduced, the effect of dissipating heat is decreased, thus failing to achieve the object. On the other hand, if their thickness is large, heat can be dissipated, but a large number of electrodes cannot be integrated in the cell, thus leading to a reduction in cell capacity.

Accordingly, the thickness of the cathode or anode case and the metal net in total is suitably 0.30 to 0.45 mm.

Preferably, the metal net is previously welded into the internal surface of the cell case thereby improving adhesion to achieve excellent electric conductivity. The material of the metal net is not particularly limited. However, when an active material e.g. a metal oxide having high potential is used as the cathode, a metal net having a poorer dissolution potential than that of the cathode active material causes the cell to be deteriorated due to high potential during storage, thus affecting the performance of the cell. Accordingly, the metal net at the side of the cathode is preferably aluminum, titanium, or stainless steel containing a relatively large amount of chromium or molybdenum. The metal net at the side of the anode is considerably poorer in potential than the cathode, thus making the particular attention paid to the cathode unnecessary. Materials in the anode include e.g. stainless steel, nickel, copper etc. Further, the surface of the metal net is preferably coated with a conductive coating in order to lower the contact resistance between the electrode group and the metal net.

In the method of arranging a thermal insulator between the case and the separator, the following thermal insulators are preferably used for their stability to the electrolyte and lithium ion: a non-metallic thermal insulator such as glassy material, or a resin selected from fluoride resins such as polytetrafluoroethylene (PTFE), tetrafluoroethylene-hexafluoropropylene copolymer (FEP), tetrafluoroethylene-ethylene copolymer (ETFE), tetrafluoroethylene-perfluoroalkyl vinyl ether copolymer (PFA) and polyvinylidene fluoride (PVDF), polyimide, liquid crystal polymer (LCP), polyphenylene sulfide (PPS), polybutylene terephthalate (PBT), polyethylene terephthalate (PET), polyethylene (PE), polypropylene (PP), polyvinyl chloride (PVC), and acetate resin. A thermal insulator having resistance to a temperature of 150° C. or more is more preferable so as to prevent the thermal insulator from being melted due to heating upon welding of terminals, thus exerting no adverse effect on the performance of the cell. The glassy material and a resin selected from fluorine resins such as PTFE, FEP, ETFE, PFA and PVDF, polyimide, LCP, PPS, and PBT are more preferable.

The thermal insulator is preferably in the form of a flexible material such as film, fabric, nonwoven fabric and fiber, to bring about good adhesion to the current-collecting member in the electrodes as well as high thermally insulating effect. Further, these materials are used as the substrate in a tape form preferably provided with an adhesive on one or both sides thereof, thus effectively preventing dislocation of the current-collecting member and the thermal insulator. Although the shape of the insulating material is not particularly limited, the area thereof is preferably larger than the area of the current-collecting portion in the electrode group so that in welding of terminals, a high degree of freedom can be achieved for the position and direction of the terminals.

When the thermal insulator is too thin, the effect of heat insulation is insufficient thus failing to achieve the object. On the other hand, when it is too thick, the amount of the active material capable of being integrated in the cell is decreased, resulting in a reduction in cell capacity. Accordingly, the thickness of the thermal insulator is preferably 0.05 to 0.2 mm.

In the flat non-aqueous electrolyte secondary cell of the present invention, the area of the electrodes is large to generate large electric current so that in unforeseen circumstances such as internal short-circuiting and excessive discharge, gas is generated in a large amount, which may lead to breakage. In the structure of the cell, however, a breakage-preventing device such as a safety element in the conventional cylindrical cell cannot be installed. Accordingly, when gas is generated in a too large amount, the cell may be broken to permit the cell content and the vessel to be scattered, which may result in not only damaging a device using the cell but also harming the human body.

The flat non-aqueous electrolyte secondary cell of the present invention can use the following constitution thereby preventing the breakage of the cell and improving safety. That is, the cell is provided with a cutting at the side of the cathode case. Even if it is provided with a cutting, the insulating packing is compressed in a normal state in the direction of diameter and the direction of height, thus preventing leakage of the electrolyte; however, upon an increase in the internal pressure due to uncontrolled heating, the insulating gasket is released through the cutting, and the breakage can thereby be prevented.

To prevent the breakage of the cell certainly upon uncontrolled heating and to prevent inconveniences such as leakage of the electrolyte from the cell in a normal state, it is preferable that the width of a cutting provided at the side of the cathode case has a central angle of $0.1\pi$ to $0.9\pi$ rad to the circumference of the cathode case, the depth of the cutting is 5 to 30% of the height of the cathode case, as shown in the experiment described below.

Further, in the present invention, a lengthwise groove is formed in the opening-sealed portion in the cathode vessel to form a thin-plate portion, so that when an abnormal gas is generated in the cell to increase the internal pressure, the gas can be discharged therethrough to the outside of the cell. That is, by the increase in the internal pressure, the lengthwise-groove thin-plate portion in the opening-sealed portion in the cathode vessel is pushed up by the anode vessel, whereby the lengthwise-groove thin-plate portion is deformed and broken to cause the anode vessel to be opened like a bivalve, thus discharging the gas to the outside of the cell. Accordingly, the breakage of the cell by which the anode vessel is separated from the main body of the cell thus scattering the cell content can be prevented.

Further, in the present invention, one or more shattering grooves having a concave shape in section can be formed in the anode case in order to prevent the breakage of the cell in the same way as above. By doing so, even if the cell is placed in abnormal circumstances due to e.g. the misuse of the cell, the breakage or explosion thereof can be prevented by opening the above-described shattering grooves. Further, the shattering grooves having a concave shape in section are provided in the anode case and thus not affected by the electrolyte and the cathode active material (oxidizing agent), so they are not corroded. Preferably, the shattering grooves described above are formed on the external surface of the anode case in order to work normally even if the cell is placed in abnormal circumstances.

In the flat non-aqueous electrolyte secondary cell described above, the volume of the active material is significantly changed upon charge and discharge, and upon discharge, the electrode group is shrunk to fail to keep contact with the cell vessel so that the internal resistance is increased to cause a reduction in voltage upon discharge of large electric current. To prevent this problem in the invention, the internal surface of the cathode case and/or the anode case can be provided with unevenness or protrusions. The dimension of the protrusion is 0.2 to 2.0 mm in diameter and 0.01 to 0.50 mm in height in order to achieve the satisfactory effect. The number of protrusions may be 1 or more. In place of protrusions, unevenness may be provided by embossing.

The cell of the present invention has been described mainly by reference to the coin- or button-shaped, flat cell wherein the outermost diameter of the cell is longer than the height of the cell, but the cell of the present invention is not limited to such an example and can be applied similarly to flat cells of unique elliptic or rectangular shape.

EXAMPLES

Hereinafter, the present invention is described in more detail by reference to the Examples and Comparative Examples.

Example 1

A process for producing the cell of the present invention in Example 1 is described by reference to the sectional drawing in FIG. 1.

First, 5 parts by weight of acetylene black and 5 parts by weight of graphite powder were added as electrically conductive agents to 100 parts by weight of $LiCoO_2$, and 5 parts by weight of polyvinylidene fluoride was added as a binding agent, and these materials were diluted with N-methyl pyrrolidone and mixed to give a cathode mix for cell in a slurry form. Then, this cathode mix was applied with a doctor blade onto one side of an aluminum foil of 0.02 mm in thickness as a cathode current-collecting body 2a, followed by drying it. This procedure of application and drying was repeatedly conducted until the thickness of the resulting coating of the active material-containing layer reached 0.39 mm, whereby the cathode active material-containing layer 2b was formed on one side of the aluminum foil to prepare a single-coated cathode.

Then, both sides of an aluminum foil were coated with the cathode mix in the same manner as above until the thickness of the resulting coating of the active material-containing layer on each side reached 0.39 mm, to prepare a double-coated cathode.

Then, 2.5 weight parts each of styrene butadiene rubber (SBR) and carboxymethyl cellulose (CMC) were added as binding agents to 100 parts by weight of graphitized mesophase pitch carbon fiber powder, then diluted with de-ionized water and mixed to give an anode mix for cell in a slurry form. This anode mix for cell was repeatedly applied and dried on a copper foil of 0.02 mm in thickness as an anode current-collecting body 4a, to form an active material-containing layer 4b of 0.39 mm in thickness, whereby a single-coated anode was prepared.

Then, both sides of a copper foil were coated in the same manner as for this single-coated anode until the thickness of the coating of the anode active material-containing layer on each side reached 0.39 mm, to prepare a double-coated anode.

These electrodes were cut into square pieces of 13 mm in width and 13 mm in length having a protrusion of 6 mm in width and 2 mm in length on one edge thereof, and then the active material-containing layer formed on this protrusion was removed to expose the aluminum foil or copper foil as an electrically connecting portion, whereby square double- and single-coated cathode and anode plates of 13 mm in width and 13 mm in length having the active material-containing layer formed thereon were prepared.

Then, the cathode active material-containing layer formed on the single-coated cathode plate was arranged to face the double-coated anode plate via separator 3 consisting of a polyethylene fine-porous membrane of 25 μm in thickness, such that the electrically connecting portion in the anode was positioned in the opposite side to the electrically connecting portion in the cathode plate. Then, the double-coated cathode plate was installed such that its electrically connecting portion was directed in the same direction as the previously arranged cathode plate, followed by arranging another single-sided anode plate opposite the double-coated cathode plate via separator 3 such that the anode active material-containing layer 4b on the single-coated anode plate was brought into contact with the separator, while the electrically connecting portion in the single-coated anode plate was directed in the same direction as the electrically connecting portion in the previously arranged anode plate. In this manner, the electrode group shown in FIG. 1 is constructed. That is, in this drawing, all the electrically connecting portions in the cathodes are exposed from the left of the electrode group, while all the electrically conductive portions in the anodes are exposed from the right of the electrode group, and the respective exposed electrically connecting portions are electrically connected.

The electrode group thus constructed was dried at 85° C. for 12 hours, and the uncoated side (that is, the anode current-collecting body 4a) of the single-coated anode plate in the electrode group was arranged to be brought into contact with the internal bottom of the anode metal case 5 having the insulating gasket 6 (opening diameter, 20 mm; opening area, 3.14 cm$^2$) integrated therein. Then, a non-aqueous electrolyte prepared by dissolving 1 mol/l LiPF$_6$ as supporting electrolyte in a mixed solvent consisting of ethylene carbonate and methyl ethyl carbonate in a volume ratio of 1:1 was injected into it. Further, the stainless steel cathode case 1 was fit thereto so as to be brought into contact with the uncoated side (that is, the cathode current-collecting body 2a) of the single-coated cathode plate in the electrode group. After the resulting cell was turned upside down, the cathode case was caulked to seal the opening, to construct the flat non-aqueous electrolyte secondary cell of 3 mm in thickness and 24.5 mm in diameter shown in FIG. 1. The number of faces where a cathode was opposite an anode via a separator is 3 in total, and the total sum of the areas of the opposing cathodes and anodes is 5.1 cm$^2$.

Example 2

A cell was constructed in the same manner as in Example 1 except that the coating of the active material-containing layer in each of the cathode and anode in the electrode group was 0.22 mm in thickness on one side, and the number of double-coated cathodes or double-coated anodes laminated internally in the electrode group was 2. The number of faces where a cathode was opposite an anode via a separator is 5 in total, and the total sum of the areas of the opposing cathodes and anodes is 8.5 cm$^2$.

Example 3

A cell was constructed in the same manner as in Example 1 except that the coating of the active material-containing layer in each of the cathode and anode in the electrode group was 0.15 mm in thickness on one side, and the number of double-coated cathodes or double-coated anodes laminated internally in the electrode group was 3. The number of faces where a cathode was opposite an anode via a separator is 7 in total, and the total sum of the areas of the opposing cathodes and anodes is 11.8 cm$^2$.

Example 4

A cell was constructed in the same manner as in Example 1 except that the coating of the active material-containing layer in each of the cathode and anode in the electrode group was 0.11 mm in thickness on one side, and the number of double-coated cathodes or double-coated anodes laminated internally in the electrode group was 4. The number of faces where a cathode was opposite an anode via a separator is 9 in total, and the total sum of the areas of the opposing cathodes and anodes is 15.2 cm$^2$.

Comparative Example 1

Figure 4:
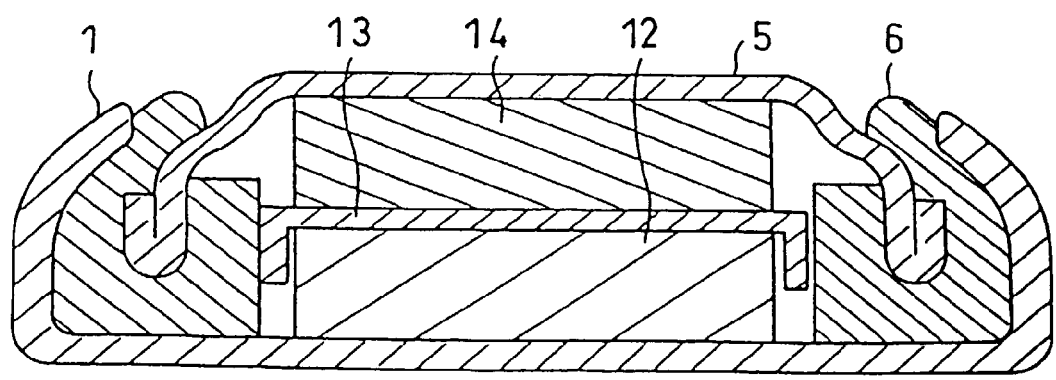
FIG. 4. A coin-shaped or button-shaped flat non-aqueous electrolyte secondary cell.

Comparative Example 1 is described by reference to FIG. 4.

Five parts by weight of acetylene black and 5 parts by weight of graphite powder were added as electrically conductive agents to 100 parts by weight of LiCoO$_2$, and 5 parts by weight of polyethylene tetrafluoride was added as a binding agent, and these materials were mixed and ground to give a cathode mix for cell in a granular form. Then, this cathode mix was compression-molded into a cathode tablet 12 having a diameter of 19 mm and a thickness of 1.15 mm.

Then, 2.5 weight parts each of styrene butadiene rubber (SBR) and carboxymethyl cellulose (CMC) were added as binding agents to 100 parts by weight of graphitized mesophase pitch carbon fiber powder, then mixed, dried and ground to give an anode mix for cell in a granular form. This anode mix was compression-molded into an anode tablet 14 having a diameter of 19 mm and a thickness of 1.15 mm.

Then, these positive and anode tablets were dried at 85° C. for 12 hours. The anode tablet 14, the separator 13 made of a polypropylene non-woven fabric of 0.2 mm in thickness, and the cathode tablet 12 were arranged in this order in an anode case 5 having an insulating gasket 6 with an opening area of 3.14 cm$^2$ integrated therein. Then, a non-aqueous electrolyte prepared by dissolving 1 mol/l LiPF$_6$ as supporting electrolyte in a mixed solvent of ethylene carbonate and methyl ethyl carbonate in a volume ratio of 1:1 was injected into it. Further, the stainless steel cathode case 1 was fit thereto, and after the resulting cell was turned upside down, the cathode case was caulked to construct a flat non-aqueous electrolyte secondary cell of 3 mm in thickness and 24.5 mm in diameter. The number of faces where a cathode was opposite an anode via a separator is 1 in total, and the total sum of the areas of the opposing cathode and anode is 2.8 cm$^2$.

Comparative Example 2

A single-coated cathode and a single-coated anode each having a coated active material-containing layer of 1.24 mm in thickness were prepared in the same manner as in Example 1 and arranged to be opposite to each other via a separator such that the active material layer was placed in the side of the separator, and a cell was prepared in the same manner as in Example 1. Accordingly, the number of faces where a cathode was opposite an anode via a separator is 1 in total, and the total sum of the areas of the opposing cathode and anode is 1.7 cm$^2$.

The cells thus prepared in the Examples and the Comparative Examples were initially charged for 48 hours at a constant current of 3 mA at a constant voltage of 4.2 V. Thereafter, the cells were discharged at a constant current of 30 mA until 3.0 V to determine their heavy-loading discharge capacity. The results are shown in Table 1.

wherein the opening was sealed by caulking the cathode case, but the cathode and anode may be exchanged so that the opening of the anode case is sealed by caulking. Further, the shape of the cell may not be necessarily round, and the present invention can also be applied to flat non-aqueous electrolyte secondary cells of unique elliptic or rectangular shape.

Now, examples of the cells of this invention having a wound cell (electrode) group are described.

Example 5

FIG. 2 is a sectional drawing of the cell of the present invention in Example 5.

Hereinafter, a process for producing the cell in Example 5 is described.

First, 5 parts by weight of acetylene black and 5 parts by weight of graphite powder were added as electrically conductive agents to 100 parts by weight of LiCoO$_2$, and 5 parts by weight of polyvinylidene fluoride was added as a binding agent, and these materials were diluted with N-methyl pyrrolidone and mixed to give a cathode mix for cell in a slurry form. Then, this cathode mix was applied with a doctor blade onto one side of an aluminum foil of 0.02 mm in thickness as a cathode current-collecting body, followed by drying it. This procedure of application and drying was repeatedly conducted until the thickness of the resulting

TABLE 1

| | kind of electrodes | thickness of active material-containing layer (mm) | number of cathode-anode faces | sum of cathode-anode areas (cm$^2$) | heavy-loading discharge capacity (mAh) |
|---|---|---|---|---|---|
| comp. examp. 1 | tablet electrode | 1.15 | 1 | 2.8 | 6.4 |
| comp. examp. 2 | coated electrode | 1.24 | 1 | 1.7 | 2.4 |
| example 1 | coated electrode | 0.39 | 3 | 5.1 | 22.8 |
| example 2 | coated electrode | 0.22 | 5 | 8.5 | 52.7 |
| example 3 | coated electrode | 0.15 | 7 | 11.8 | 53.7 |
| example 4 | coated electrode | 0.11 | 9 | 15.2 | 52.5 |

As is evident from Table 1, the cells in the Examples have a significantly larger discharge capacity upon heavy discharge than the cell in Comparative Example 1 (wherein a tablet-shaped electrode prepared by the conventional method of forming a granular depolarizing mix for cell is used and the area where the cathode is opposite the anode is smaller than the area of the opening of the gasket) and the cell in Comparative Example 2 (wherein the number of faces where a cathode is opposite an anode is only 1, and the area where the cathode is opposite the anode is smaller than the area of the opening of the gasket).

In the Examples of this invention, the flat non-aqueous solvent secondary cell wherein a non-aqueous solvent was used as the non-aqueous electrolyte, but as a matter of course, these examples can also be applied to polymer secondary cells using a polymer electrolyte as the non-aqueous electrolyte or to solid electrolyte secondary cells using a solid electrolyte. Further, a polymer thin film or solid electrolyte film can also be used in place of the resin separator. The cells described above are mainly coin-shaped coating of the cathode active material-containing layer reached 0.15 mm, whereby the cathode active material-containing layer 2b was formed on one side of the aluminum foil. Then, the active material-containing layer on a portion 10 mm apart from the edge was removed from the surface of this electrode body, whereby the aluminum layer was exposed to form an electrically connecting portion. Then, the electrode body was cut into pieces of 15 mm in width and 120 mm in length to prepare a cathode plate.

Then, 2.5 weight parts each of styrene butadiene rubber (SBR) and carboxymethyl cellulose (CMC) were added as binding agents to 100 parts by weight of graphitized mesophase pitch carbon fiber powder, then diluted with de-ionized water and mixed to give an anode mix for cell in a slurry form. This anode depolarizing mix was repeatedly applied and dried in the same manner as for the cathode, on a copper foil of 0.02 mm in thickness as an anode current-collecting body, to form an active material-containing layer 4b of 0.15 mm in thickness, whereby a double-coated anode was prepared. Then, the active material-containing layer on a portion 10 mm apart from the edge was removed from one side of this electrode body, whereby the copper layer was exposed to form an electrically connecting portion. Then, the electrode body was cut into pieces of 15 mm in width and 120 mm in length to prepare an anode plate.

Then, the cathode and the anode were wound in a spiral form via separator 3 consisting of a polyethylene fine-porous film of 25 μm in thickness such that the wound electrode group ended in the cathode and anode electrically connecting portions in the outer periphery. The electrode group thus prepared was pressurized in such a direction that the face where the cathode was opposite the anode was parallel to the flat plane of the flat cell. The electrode group was pressurized to eliminate a space in the center of the wound electrodes. The total sum of the area of the face where the cathode was opposite the anode via the separator in this cell is 34.5 cm$^2$.

The electrode group thus constructed was dried at 85° C. for 12 hours, and the uncoated side of the single-coated anode plate in the electrode group, was arranged to be brought into contact with the internal bottom of the anode metal case 5 having the insulating gasket 6 with an opening diameter of 20 mm and an opening area of 3.14 cm$^2$ integrated therein. Then, a non-aqueous electrolyte prepared by dissolving 1 mol/l LiPF$_6$ as supporting electrolyte in a mixed solvent consisting of ethylene carbonate and methyl ethyl carbonate in a volume ratio of 1:1 was injected into it. Further, the stainless steel cathode case 1 was fit thereto so as to be brought into contact with the uncoated side of the single-coated cathode plate in the electrode group. After the resulting cell was turned upside down, the cathode case was caulked to seal the opening, to construct the flat non-aqueous electrolyte secondary cell of 3 mm in thickness and 24.5 mm in diameter in Example 5.

Example 6

A cell was prepared in the same manner as in Example 5 except that the cathode and the anode, both in a sheet form, were spirally wound via a separator and simultaneously bent at predetermined intervals such that that the face where the cathode was opposite the anode was parallel to the flat plane of the flat cell.

The cells in the Examples 5 and 6 and Comparative Example 1 were initially charged for 48 hours at a constant current of 3 mA at a constant voltage of 4.2 V. Thereafter, the cells were discharged at a constant current of 30 mA until 3.0 V to determine their discharge capacity. The results are shown in Table 2.

TABLE 2

|  | kind of electrodes | number of cathode-anode faces (cm$^2$) | discharge capacity at 30 mA constant current (mAh) |
|---|---|---|---|
| example 5 | coated electrode | 34.5 | 51.9 |
| example 6 | coated electrode | 34.5 | 52.7 |
| comp. examp. 1 | tablet electrode | 2.8 | 6.4 |

As is evident from Table 2, the cells of this invention in Examples 5 and 6 have a significantly larger discharge capacity than that of the cell in Comparative Example 1 (wherein a tablet-shaped electrode prepared by the conventional method of forming a granular depolarizing mix for cell is used and the area where the cathode is opposite the anode is smaller than the area of the opening of the gasket). For the winding system, the system of spirally winding the electrodes while bending them as shown in Example 2 is superior in current collection between the electrode layers and heavy loading characteristics.

In the examples described above, the flat non-aqueous solvent secondary cell wherein a non-aqueous solvent was used in the non-aqueous electrolyte, but as a matter of course, these examples can also be applied to polymer secondary cells using a polymer electrolyte as the non-aqueous electrolyte or to solid electrolyte secondary cells using a solid electrolyte. Further, a polymer thin film or solid electrolyte film can also be used in place of the resin separator. The cell was described above is mainly coin-shaped wherein the opening was sealed by caulking the cathode case, but the cathode and anode may be exchanged so that the opening of the anode case is sealed by caulking. Further, the shape of the cell may not be necessarily coin-shaped, and the present invention can also be applied to flat non-aqueous electrolyte secondary cells of unique elliptic or rectangular shape.

Now, examples of the cells of this invention wherein an opening-sealing plate was used in place of the insulating gasket to close the opening are described.

Example 7

A process for producing the cell in this example is described by reference to the sectional drawing in FIG. 3.

Double-coated and single-coated cathode and anode plates having the same dimension were constructed in the same manner as in Example 1. Then, these cathode and anode plates were used to construct an electrode group in the same manner as in Example 1.

The electrode group thus constructed was dried at 85° C. for 12 hours, and by use of this electrode group, the flat non-aqueous electrolyte secondary cell shown in FIG. 3 was constructed in the following manner. That is, the uncoated side (that is, the cathode current-collecting body 2a) of the single-coated cathode plate in the electrode group was arranged to be brought into contact with the internal bottom of the cathode case 11 having an opening diameter of 20 mm and an opening area of 3.14 cm$^2$, which had been insulated by application of SBR onto the internal surface thereof. Then, a non-aqueous electrolyte prepared by dissolving 1 mol/l LiPF$_6$ as supporting electrolyte in a mixed solvent consisting of ethylene carbonate and methyl ethyl carbonate in a volume ratio of 1:1 was injected into it.

The anode terminal 8 which was electrically integrated in the current-collecting plate 10 is arranged in the center of the opening-sealed plate 7, and the uncoated side (that is, the anode current-collecting body 4a) of the single-coated anode plate in the electrode group is brought into contact with the current-collecting plate 10. The anode terminal 8 and the opening-sealed plate 7 are electrically insulated by the glass seal 9. The cathode case 11 and the opening-sealed plate 7 are sealed by laser welding to construct a flat non-aqueous electrolyte secondary cell of 5 mm in height and 21.0 mm in diameter. The number of faces where a cathode was opposite an anode via a separator is 3 in total, and the total sum of the areas of the opposing cathodes and anodes is 5.1 cm$^2$.

Example 8

A cell was constructed in the same manner as in Example 7 except that the coating of the active material-containing layer in each of the cathode and anode in the electrode group was 0.22 mm in thickness on one side, and the number of double-coated cathodes or double-coated anodes laminated internally in the electrode group was 2. The number of faces where a cathode was opposite an anode via a separator is 5 in total, and the total sum of the areas of the opposing cathodes and anodes is 8.5 cm$^2$.

Example 9

A cell was constructed in the same manner as in Example 7 except that the coating of the active material-containing layer in each of the cathode and anode in the electrode group was 0.15 mm in thickness on one side, and the number of double-coated cathodes or double-coated anodes laminated internally in the electrode group was 3. The number of faces where a cathode was opposite an anode via a separator is 7 in total, and the total sum of the areas of the opposing cathodes and anodes is 11.8 cm$^2$.

Example 10

A cell was constructed in the same manner as in Example 7 except that the coating of the active material-containing layer in each of the cathode and anode in the electrode group was 0.11 mm in thickness on one side, and the number of double-coated cathodes or double-coated anodes laminated internally in the electrode group was 4. The number of faces where a cathode was opposite an anode via a separator is 9 in total, and the total sum of the areas of the opposing cathodes and anodes is 15.2 cm$^2$.

Comparative Example 3

Figure 5:
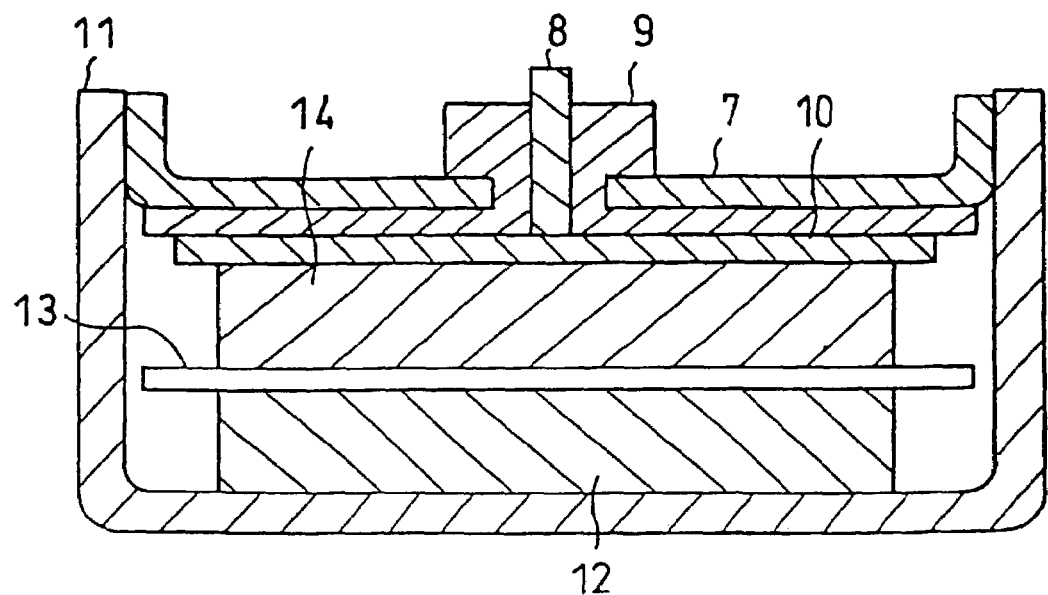
FIG. 5. Flat non-aqueous electrolyte secondary cell.

Cathode and anode tablets were prepared in the same manner as in Comparative Example 1 and dried at 85° C. for 12 hours. As shown in FIG. 5, the cathode tablet 12, the separator 13 and the anode tablet 14 were arranged in this order on the internal bottom of the same cathode case 11 as in Example 7, and the same non-aqueous electrolyte as in Example 7 was injected into it. The cathode case 11 and the opening-sealed plate 7 were sealed by laser welding to construct the flat non-aqueous electrolyte secondary cell of 5 mm in thickness and 21.0 mm in diameter shown in FIG. 5.

Figure 3:
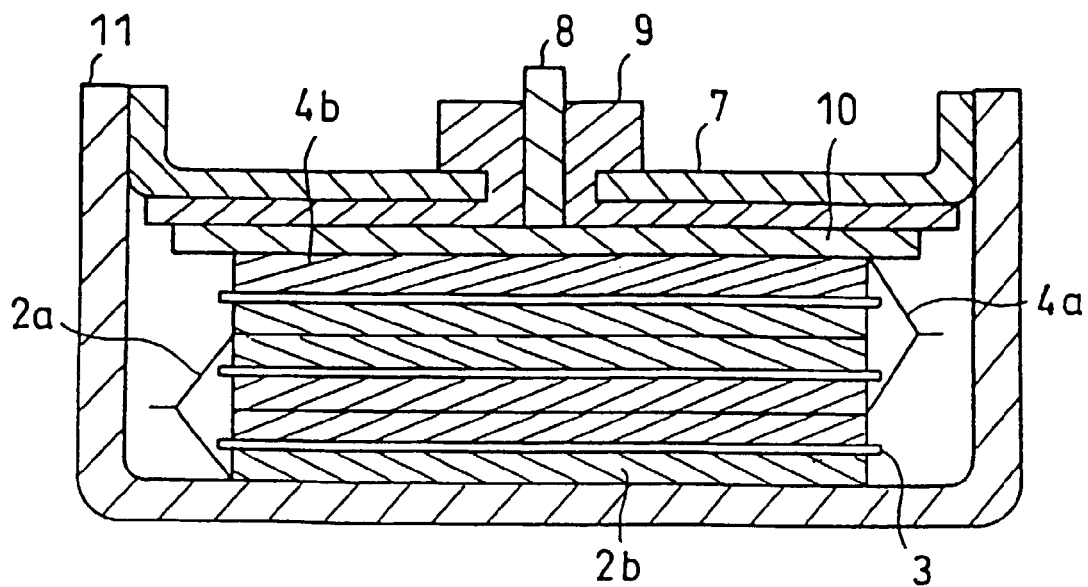
FIG. 3. Non-aqueous solvent secondary cell, sectional drawing.

In FIG. 5, the same symbols are used to refer to the same members in FIG. 3. The number of faces where a cathode was opposite an anode via a separator is 1 in total, and the total sum of the areas of the opposing cathode and anode is 2.8 cm$^2$.

Comparative Example 4

A cell was constructed in the same manner as in Example 7 except that the electrode group consisted of one cathode and one anode, both of which were single-coated electrodes, and the thickness of the coated active material-containing layer for each electrode was 1.24 mm. The number of faces where a cathode was opposite an anode via a separator is 1 in total, and the total sum of the areas of the opposing cathode and anode is 1.7 cm$^2$.

The respective cells thus constructed in Examples 7 to 10 and Comparative Examples 3 to 4 were initially charged for 48 hours at a constant current of 3 mA at a constant voltage of 4.2 V. Thereafter, the cells were discharged at a constant current of 30 mA until 3.0 V to determine their heavy loading discharge capacity. The results are shown in Table 3.

TABLE 3

| | kind of electrodes | thickness of active material-containing layer (mm) | number of cathode-anode faces | sum of cathode-anode areas (cm$^2$) | heavy-loading discharge capacity (mAh) |
|---|---|---|---|---|---|
| comp. examp. 3 | tablet electrode | 1.15 | 1 | 2.8 | 6.4 |
| comp. examp. 4 | coated electrode | 1.24 | 1 | 1.7 | 2.4 |
| example 7 | coated electrode | 0.39 | 3 | 5.1 | 22.8 |
| example 8 | coated electrode | 0.22 | 5 | 8.5 | 52.7 |
| example 9 | coated electrode | 0.15 | 7 | 11.8 | 53.7 |
| example 10 | coated electrode | 0.11 | 9 | 15.2 | 52.5 |

As is evident from Table 3, the respective cells in the Examples above have a significantly larger discharge capacity upon heavy-loading discharge than the cell in Comparative Example 3 using tablet-shaped electrodes prepared by the conventional method of forming a granular mix for cell or than the cell in Comparative Example 4 wherein the number of faces where a cathode was opposite an anode was only 1 and thus the area of the opposing cathode and anode was small.

In the examples described above, the flat non-aqueous solvent secondary cell wherein a non-aqueous solvent was used in the non-aqueous electrolyte, but as a matter of course, these examples can also be applied to polymer secondary cells using a polymer electrolyte as the non-aqueous electrolyte or to solid electrolyte secondary cells using a solid electrolyte. Further, a polymer thin film or solid electrolyte film can also be used in place of the resin separator. The cathode and anode may be exchanged. Further, the shape of the cell may not be necessarily round, and the present invention can also be applied to flat non-aqueous electrolyte secondary cells of unique elliptic or rectangular shape.

Now, the examples where the electrolyte was examined are destribed.

A. Experiment on the Type of Solvent of Non-Aqueous Electrolyte

Example 11

A flat non-aqueous electrolyte secondary cell was constructed in the same manner as in Example 5 except that a non-aqueous electrolyte containing 1.5 mol/l $LiBF_4$ as a supporting electrolyte dissolved in a mixed solvent of GBL and EC in a ratio of 2:1 was injected into the cell in Example 5.

Comparative Example 5

A cell was constructed in the same manner as in Example 5 except that a non-aqueous electrolyte containing 1.5 mol/l $LiBF_4$ as a supporting electrolyte dissolved in a mixed solvent of diethyl carbonate (DEC) and EC in a ratio of 2:1 was injected.

Comparative Example 6

A cell was constructed in the same manner as in Example 5 except that a non-aqueous electrolyte containing 1.5 mol/l $LiBF_4$ as a supporting electrolyte dissolved in a mixed solvent of methyl ethyl carbonate (MEC) and EC in a ratio of 2:1 was injected.

The thus constructed cells in Example 11, Comparative Examples 5 and 6 were initially charged for 48 hours at a constant current of 3 mA at a constant voltage of 4.2 V Thereafter, the cells were examined under the following conditions, that is, in a test of high-temperature storage characteristic 1, a heating test and a short-circuiting test to examine the characteristics of the cells. The results are shown in Table 4.

Initial Discharge Capacity

The cell was discharged at a constant current of 30 mA in an atmosphere at 20° C., to determine the capacity of discharge until the voltage in the closed circuit became 3.0 V High-Temperature Storage Characteristic 1

The cell in a charged state was stored for 30 days in an atmosphere at 60° C., and the cell was measured for its height and then discharged at a constant current of 30 mA in an atmosphere at 20° C., to determine the capacity of discharge until the voltage in the closed circuit became 3.0 V The capacity (%) after high-temperature storage, relative to the initial discharge capacity, is shown in Table 4.

Heating Test

The cells in a charged state were heated to 150° C. at an increasing temperature of 5° C./min., and the cells were kept at 150° C. for 3 hours and then examined for their state. The number of broken cells in this test is shown in Table 4.

Short-Circuiting Test

The cells in a charged state were short-circuited by connecting the cathode terminal to the anode terminal via a copper wire having a sectional area of 1.3 $mm^2$. The number of broken cells in this test is shown in Table 4.

TABLE 4

| | non-aqueous electrolyte | high-temperature storage characteristics 1 (%) | number of broken cell/all tested cell at heating test | number of broken cell/all tested cell at short-circuiting test |
|---|---|---|---|---|
| example 11 | 1.5 mol/$LiBF_4$ EC/GBL | 84 | 0/10 | 0/10 |
| comp. examp. 5 | 1.5 mol/$LiBF_4$ EC/DEC | 42 | 9/10 | 8/10 |
| comp. examp. 6 | 1.5 mol/$LiBF_4$ EC/MEC | 44 | 10/10 | 7/10 |

As can be seen from Table 4, when the mixed solvent of DEC and EC or the mixed solvent of MEC and EC was used as the solvent, the cell undergoes in deterioration in capacity after storage at high temperatures, and when subjected to the heating test or short-circuiting test, the cell is broken. On the other hand, it was found that when the mixed solvent of GBL and EC is used as the solvent, the cell is hardly deteriorated after storage at high temperatures, and when subjected to the heating test or short-circuiting test, the cell is not broken.

B. Experiment for Examination of Characteristics on the Volume Mixing Ratio of GBL and EC

Example 12

A cell was constructed in the same manner as in Example 5 except that a non-aqueous electrolyte containing 1.5 mol/l $LiBF_4$ as a supporting electrolyte dissolved in a mixed solvent of GBL and EC in a ratio of 10:3 was injected.

Example 13

A cell was constructed in the same manner as in Example 5 except that a non-aqueous electrolyte containing 1.5 mol/l $LiBF_4$ as a supporting electrolyte dissolved in a mixed solvent of GBL and EC in a ratio of 1:1 was injected.

Reference Example 1

A cell was constructed in the same manner as in Example 5 except that a non-aqueous electrolyte containing 1.5 mol/l $LiBF_4$ as a supporting electrolyte dissolved in a mixed solvent of GBL and EC in a ratio of 10:1 was injected.

Reference Example 2

A cell was constructed in the same manner as in Example 5 except that a non-aqueous electrolyte containing 1.5 mol/l $LiBF_4$ as a supporting electrolyte dissolved in a mixed solvent of GBL and EC in a ratio of 2:3 was injected.

The thus constructed 10 cells in each of Examples 11, 12 and 13 and Reference Examples 1 and 2 were initially charged for 48 hours at a constant current of 3 mA at a constant voltage of 4.2 V. Thereafter, the cells were examined for their initial discharge capacity in the same manner as in Experiment A and then for their discharge capacity in a low-temperature atmosphere and cycle characteristics as shown below, to examine the characteristics of the cells. The results are shown in Table 5.

Discharge Capacity in a Low Temperature Atmosphere

The cells were discharged at a constant current of 30 mA in an atmosphere at −30° C., to examine the capacity of discharge until the voltage in the closed circuit became 3.0 V The degree of utilization, relative to the initial discharge capacity, is shown in Table 5.

Cycle Characteristics

The cell was discharged at a constant current of 30 mA in an atmosphere at 20° C., to measure the capacity of discharge until the voltage in the closed circuit became 3.0 V. Thereafter, the cell was charged for 3 hours at a constant current of 30 mA at a constant voltage of 4.2 V. The cell was subjected to 100 cycles of this discharge and charge. The discharge capacity (%) in the 100th cycle, relative to the initial discharge capacity, is shown in Table 5.

TABLE 5

| | non-aqueous electrolyte | ratio of EC/GBL | degree of utilization at a low temperature (%) | cycle characteristics (%) |
|---|---|---|---|---|
| ref. examp. 1 | 1.5 mol/$LiBF_4$ EC/GBL | 0.1 | 83 | 68 |
| example 12 | | 0.3 | 81 | 80 |
| example 11 | | 0.5 | 80 | 81 |
| example 13 | | 1.0 | 79 | 83 |
| ref. examp. 2 | | 1.5 | 48 | 83 |

As can be seen from Table 5, when the ratio of EC to GBL is high (Reference Example 2), the low-temperature characteristic is lowered, while when the ratio of EC is low (Reference Example 1), the cycle characteristics are lowered. This is because a reduction in the mixing ratio of EC leads to insufficient formation of a protective coating on the surface of the carbon material constituting the anode, thus permitting decomposition of BGL.

On the other hand, the cells in the Examples above are superior in low-temperature characteristic and cycle characteristics.

C. Experiment on the Type of Supporting Electrolyte in Electrolyte

Comparative Example 7

A cell was prepared in the same manner as in Example 11 except that the supporting electrolyte in the non-aqueous electrolyte was $LiPF_6$.

Comparative Example 8

A cell was prepared in the same manner as in Example 11 except that the supporting electrolyte in the non-aqueous electrolyte was $LiClO_4$.

Comparative Example 9

A cell was prepared in the same manner as in Example 11 except that the supporting electrolyte in the non-aqueous electrolyte was $LiCF_3SO_3$.

The thus constructed cells in Example 11, Comparative Examples 7 to 9 were initially charged for 48 hours at a constant current of 3 mA at a constant voltage of 4.2 V Thereafter, their initial discharge capacity was confirmed in the same manner as in Experiment A, and then the cells were examined under the following conditions to determine their high-temperature storage characteristic 2 and heavy-loading discharge capacity in order to examine the characteristics of the cells. The results are shown in Table 6.

High-Temperature Storage Characteristic 2

The cell in a charged state was stored for 30 days in an atmosphere at 60° C., and the height of the cell was measured. The increase (%) of the height, relative to the height before storage, was determined. Thereafter, the cell was discharged at a constant current of 30 mA in an atmosphere at 20° C., to determine the capacity of discharge until the voltage in the closed circuit became 3.0 V. The increase (%) of the height of the cell and the capacity (%) after high-temperature storage relative to the initial discharge capacity are shown in Table 6.

Heavy-Loading Discharge Capacity

The cell was subjected to heavy-loading discharge at a constant current of 180 mA in an atmosphere at 20° C., to determine the heavy-loading discharge capacity until the voltage in the closed circuit became 3.0 V. The degree of utilization of the heavy-loading discharge capacity relative to the initial discharge capacity is shown in Table 6.

TABLE 6

| | | high temperature storage characteristics 2 | | |
|---|---|---|---|---|
| | non-aqueous electrolyte | increase of height of the cell (%) | capacity after high-temperature storage (%) | heavy-loading characteristics (%) |
| example 11 | 1.5 mol/$LiBF_4$ EC/GBL | 0.0 | 84 | 80 |
| comp. examp. 7 | 1.5 mol/$LiPF_6$ EC/GBL | 6.7 | 59 | 75 |
| comp. examp. 8 | 1.5 mol/$LiClO_4$ EC/GBL | 10.0 | 35 | 70 |
| comp examp. 9 | 1.5 mol/$LiCF_3SO_3$ EC/GBL | 0.0 | 80 | 46 |

As can be seen from Table 6, when the cells in Comparative Examples 7 and 8 are stored at a high temperature of 60° C., the non-electrolyte is decomposed to generate gas so that the height of the cell is increased, the contact between the electrode and the electrode case is worsened, and the internal resistance of the cell is increased. Accordingly, no sufficient discharge capacity can be obtained. In Comparative Example 9, the electric conductivity of $LiCF_3SO_3$ is low so that the resulting cell is inferior in the desired loading discharge characteristics.

On the other hand, the cell in Example 11 does not generate gas during storage even at high temperatures, and the internal resistance is not increased, thus achieving sufficient capacity and excellent heavy loading characteristics.

D. Experiment for Examining Characteristics on the Concentration of Supporting Electrolyte in Electrolyte Reference Example 3

A cell was prepared in the same manner as in Example 11 except that the concentration of the supporting electrolyte in the non-aqueous electrolyte was 1.0 mol/l.

Example 14

A cell was prepared in the same manner as in Example 11 except that the concentration of the supporting electrolyte in the non-aqueous electrolyte was 1.3 mol/l.

Example 15

A cell was prepared in the same manner as in Example 11 except that the concentration of the supporting electrolyte in the non-aqueous electrolyte was 1.8 mol/l.

Reference Example 4

A cell was prepared in the same manner as in Example 11 except that the concentration of the supporting electrolyte in the non-aqueous electrolyte was 2.0 mol/l.

The thus constructed cells in the Examples 11, 14 and 15 and Reference Examples 3 and 4 were initially charged for 48 hours at a constant current of 3 mA at a constant voltage of 4.2 V, to determine their initial discharge capacity, their discharge capacity in a low-temperature atmosphere and heavy loading discharge capacity. The results are shown in Table 7. The initial discharge capacity was measured in the same manner as in Experiment A and the capacity in a low-temperature atmosphere was measured in the same manner as in the Experiment B, and the heavy loading discharge capacity was measured in the same manner as in Experiment C.

TABLE 7

| | non-aqueous electrolyte | low-temperature characteristics (%) | heavy-loading characteristics (%) |
|---|---|---|---|
| ref. examp. 3 | 1.0 mol/$LiBF_4$ EC/GBL | 67 | 52 |
| example 14 | 1.3 mol/$LiBF_4$ EC/GBL | 75 | 79 |
| example 11 | 1.5 mol/$LiBF_4$ EC/GBL | 81 | 80 |
| example 15 | 1.8 mol/$LiBF_4$ EC/GBL | 77 | 80 |
| ref. examp. 4 | 2.0 mol/$LiBF_4$ EC/GBL | 65 | 78 |

As can be seen from this table, the rate of transfer of lithium ion in the non-aqueous electrolyte becomes optimum when the concentration of the supporting electrolyte in the non-aqueous electrolyte is in the range of 1.3 mol/l to 1.8 mol/l, thus providing a cell excellent in low-temperature characteristics and heavy loading characteristics.

Now, the examples where the material of the cathode case was examined are described.

Example 16

As the cathode case in Example 5 above, there was used a cathode case produced by plating with nickel the external surface of a stainless steel sheet prepared by adding 0.20 part by weight of niobium, 0.20 part by weight of titanium and 0.10 part by weight of aluminum to a ferrite-based stainless steel stock containing 28.50 to 32.00% chromium and 1.50 to 2.50% molybdenum, followed by pressing the nickel-plated stainless steel sheet.

Example 17

As the cathode case in Example 5 above, there was used a cathode case produced by plating with nickel the external surface of a stainless steel sheet prepared by adding 0.10 part by weight of niobium, 0.10 part by weight of titanium and 0.05 part by weight of aluminum to a ferrite-based stainless steel stock containing 28.50 to 32.00% chromium and 1.50 to 2.50% molybdenum, followed by pressing the nickel-plated stainless steel sheet.

Example 18

As the cathode case in Example 5 above, there was used a cathode case produced by plating with nickel the external surface of a stainless steel sheet prepared by adding 0.30 part by weight of niobium, 0.30 part by weight of titanium and 0.15 part by weight of aluminum to a ferrite-based stainless steel stock containing 28.50 to 32.00% chromium and 1.50 to 2.50% molybdenum, followed by pressing the nickel-plated stainless steel sheet.

Comparative Example 10

As the cathode case, there was used a cathode case produced by plating with nickel the external surface of a stainless steel sheet prepared by adding 0.05 part by weight of niobium, 0.05 part by weight of titanium and 0.025 part by weight of aluminum to a ferrite-based stainless steel stock containing 28.50 to 32.00% chromium and 1.50 to 2.50% molybdenum, followed by pressing the nickel-plated stainless steel sheet.

Comparative Example 11

As the cathode case, there was used a cathode case produced by plating with nickel the external surface of a stainless steel sheet prepared by adding 0.40 part by weight of niobium, 0.40 part by weight of titanium and 0.20 part by weight of aluminum to a ferrite-based stainless steel stock containing 28.50 to 32.00% chromium and 1.50 to 2.50% molybdenum, followed by pressing the nickel-plated stainless steel sheet.

Comparative Example 12

As the cathode case, there was used a cathode case produced by plating with nickel the external surface of a stainless steel sheet prepared by adding 28.50 to 32.00 parts by weight of chromium and 1.50 to 2.50 parts by weight of molybdenum, followed by pressing the nickel-plated stainless steel sheet. This stainless steel is an equivalent product to JIS SUS447J1.

Comparative Example 13

As the cathode case, there was used a cathode case produced by plating with nickel the external surface of a stainless steel sheet prepared by adding 17.00 to 20.00 parts by weight of chromium and 1.75 to 2.50 parts by weight of molybdenum to a ferrite-based stainless steel stock, followed by pressing the nickel-plated stainless steel sheet. This stainless steel is an equivalent product to JIS SUS444.

Comparative Example 14

As the cathode case, there was used a cathode case produced by plating with nickel the external surface of a stainless steel prepared by adding 16.00 to 18.00 parts by weight of chromium and 2.00 to 3.00 parts by weight of molybdenum and 10.00~14.00 parts by weight of nickel to an austenite-based stainless steel stock, followed by pressing the nickel-plated stainless steel sheet. This stainless steel is an equivalent product to JIS SUS316.

The chemical components in the stainless steel sheets used in the Examples and Comparative Examples above are shown in Table 8.

TABLE 8

| | chemical components (wt %) | | | | | | | | | | | |
|---|---|---|---|---|---|---|---|---|---|---|---|---|
| | C | Si | Mn | P | S | Ni | Cr | Mo | N | Nb | Ti | Al |
| example 16 | 0.007 | 0.20 | 0.20 | — | — | — | 30.00 | 2.00 | 0.010 | 0.20 | 0.20 | 0.10 |
| example 17 | 0.007 | 0.20 | 0.20 | — | — | — | 30.00 | 2.00 | 0.010 | 0.10 | 0.10 | 0.05 |
| example 18 | 0.007 | 0.20 | 0.20 | — | — | — | 30.00 | 2.00 | 0.010 | 0.30 | 0.30 | 0.15 |
| comp. examp. 10 | 0.007 | 0.20 | 0.20 | — | — | — | 30.00 | 2.00 | 0.010 | 0.05 | 0.05 | 0.025 |
| comp. examp. 11 | 0.007 | 0.20 | 0.20 | — | — | — | 30.00 | 2.00 | 0.010 | 0.40 | 0.40 | 0.20 |
| comp. examp. 12 JIS SUS447J1 | <0.010 | <0.40 | <0.40 | <0.030 | <0.020 | — | 28.50~32.00 | 1.50~2.50 | <0.015 | — | — | — |
| comp. examp. 13 JIS SUS444 | <0.025 | <1.00 | <1.00 | <0.040 | <0.030 | — | 17.00~20.00 | 1.75~2.50 | <0.025 | — | — | — |
| comp. examp. 14 JIS SUS316 | <0.080 | <1.00 | <2.00 | <0.045 | <0.030 | 10.00~14.00 | 16.00~18.00 | 2.00~3.00 | — | — | — | — |

1000 cells in each of Examples 16 to 18 and Comparative Examples 10 to 14 were constructed and initially charged for 48 hours at a constant current of 3 mA at a constant voltage of 4.2 V, and then 50 cells in each example were stored at 60° C. under dry conditions for 20 days during which a constant voltage of 4.4 V was applied, and the presence of pits on the cathode case was confirmed under a test glass. The number of pits generated is shown in Table 9.

TABLE 9

| | number of the tested cells | number of the pits generated |
|---|---|---|
| example 16 | 50 | 0 |
| example 17 | 50 | 0 |
| example 18 | 50 | 0 |
| comp. examp. 10 | 50 | 21 |
| comp. examp. 11 | 50 | 4 |
| comp. examp. 12 | 50 | 23 |
| comp. examp. 13 | 50 | 50 |
| comp. examp. 14 | 50 | 50 |

As can be seen from Table 9, no pitting occurred in the cells in Examples 16 to 18, but pitting was recognized the cells in Comparative Example 10 where niobium, titanium and aluminum were added in smaller amounts. Pitting was also recognized in Comparative Examples 12 to 14 where niobium, titanium and aluminum were not added. From the foregoing, it is found that in the non-aqueous electrolyte cells at a high voltage of 4 V or more, the pitting potential of the stainless steel stock to which chromium and molybdenum were added is lower than the potential of the cathode active material, thus causing the material in the cathode member to be eluted into the electrolyte to generate pits. Even if niobium, titanium and aluminum are added in smaller amounts, pitting occurs.

It was found that even in Comparative Example 11 wherein niobium, titanium and aluminum were added in larger amounts, a few pits were generated. This is probably because addition of titanium and aluminum in larger amounts causes inclusions and precipitates to be separated and formed, resulting in deterioration in resistance to pitting.

In these examples, an electricity-generating element comprising the cathode and anode wound via the separator was used. However, the same effect could be achieved even by use of an electricity-generating element comprising cathodes and anodes laminated via a separator or an electricity generating element comprising a cathode and an anode bent alternately via a separator.

Example 19

As the cathode case in Example 5 above, there was used a cathode case produced by plating with nickel the external surface of a stainless steel sheet prepared by adding 0.85 part by weight of niobium, 0.1 part by weight of titanium and 0.25 part by weight of copper to ferrite-based stainless steel containing 20.00 to 23.00% chromium and 1.50 to 2.50% molybdenum, followed by pressing the nickel-plated stainless steel.

Example 20

As the cathode case in Example 5 above, there was used a cathode case produced by plating with nickel the external surface of a stainless steel sheet prepared by adding 0.80 part by weight of niobium, 0.05 part by weight of titanium and 0.20 part by weight of copper to a ferrite-based stainless steel stock containing 20.00 to 23.00% chromium and 1.50 to 2.50% molybdenum, followed by pressing the nickel-plated stainless steel sheet.

Example 21

As the cathode case, there was used a cathode case produced by plating with nickel the external surface of a stainless steel sheet prepared by adding 0.90 part by weight of niobium, 0.15 part by weight of titanium and 0.30 part by weight of copper to a ferrite-based stainless steel stock containing 20.00 to 23.00% chromium and 1.50 to 2.50% molybdenum, followed by pressing the nickel-plated stainless steel sheet.

Comparative Example 15

As the cathode case, there was used a cathode case produced by plating with nickel the external surface of a stainless steel sheet prepared by adding 0.75 part by weight of niobium, 0.03 part by weight of titanium and 0.15 part by weight of copper to a ferrite-based stainless steel stock containing 20.00 to 23.00% chromium and 1.50 to 2.50% molybdenum, followed by pressing the nickel-plated stainless steel sheet.

Comparative Example 16

As the cathode case, there was used a cathode case produced by plating with nickel the external surface of a stainless steel sheet prepared by adding 0.95 part by weight of niobium, 0.20 part by weight of titanium and 0.35 part by weight of copper to a ferrite-based stainless steel stock containing 20.00 to 23.00% chromium and 1.50 to 2.50% molybdenum, followed by pressing the nickel-plated stainless steel sheet.

The chemical components in the stainless steel sheets used in Examples 19 to 21 and Comparative Examples 13 to 16 are shown in Table 10.

1000 cells in each of Examples 19 to 21 and Comparative Examples 13 to 16 were constructed and initially charged for 48 hours at a constant current of 3 mA at a constant voltage of 4.2 V, and then 50 cells in each example were stored at room temperature for 6 months during which a constant voltage of 4.4 V was applied, and the presence of pits on the cathode case was examined under a test glass. In addition, 200 cells in each example were stored for 100 days in an atmosphere at 45° C. under 93% humidity, and electrolyte leakage was examined under a test glass. Number of cells wherein pitting and electrolyte leakage occurred is shown in Table 11.

TABLE 11

|  | result of pitting test | | result of leakage test | |
| --- | --- | --- | --- | --- |
|  | number of the tested cells | number of the cells pits generated | number of the tested cells | number of the liquid-leaked cells |
| example 19 | 50 | 0 | 200 | 0 |
| example 20 | 50 | 0 | 200 | 0 |
| example 21 | 50 | 0 | 200 | 0 |
| comp. examp. 15 | 50 | 3 | 200 | 0 |
| comp. examp. 16 | 50 | 6 | 200 | 2 |
| comp. examp. 13 | 50 | 50 | 200 | 1 |
| comp. examp. 14 | 50 | 50 | 200 | 0 |

As can be seen from Table 11, no pitting occurred in the cells in Examples 19~21. However, pitting was observed in Comparative Example 15 wherein niobium, titanium and copper were added in smaller amounts. On the other hand, pitting and electrolyte leakage were recognized in Comparative Example 16 wherein niobium, titanium and copper were added in larger amounts. In Comparative Examples 13 and 14 wherein chromium and molybdenum were added, pitting was recognized, and particularly in Comparative Example 13, electrolyte leakage was also recognized.

From the foregoing, it is found that in the non-aqueous electrolyte cells at a high voltage of 4 V or more, the pitting potential of the stainless steel stock to which chromium and molybdenum were added is lower than the potential of the cathode active material, thus causing the material in the cathode member to be eluted into the electrolyte to generate pits, but by adding niobium, titanium and copper, the pitting potential of the stainless steel stock is made higher than the potential of the cathode active material, thus preventing pitting.

TABLE 10

| | chemical components (wt %) | | | | | | | | | | | |
| --- | --- | --- | --- | --- | --- | --- | --- | --- | --- | --- | --- | --- |
| | C | Si | Mn | P | S | Ni | Cr | Mo | N | Nb | Ti | Cu |
| example 19 | 0.007 | 0.15 | 0.10 | — | — | 0.2 | 22.00 | 2.00 | — | 0.85 | 0.10 | 0.25 |
| example 20 | 0.007 | 0.15 | 0.10 | — | — | 0.2 | 22.00 | 2.00 | — | 0.80 | 0.05 | 0.20 |
| example 21 | 0.007 | 0.15 | 0.10 | — | — | 0.2 | 22.00 | 2.00 | — | 0.90 | 0.15 | 0.30 |
| comp. examp. 15 | 0.007 | 0.15 | 0.10 | — | — | 0.2 | 22.00 | 2.00 | — | 0.75 | 0.03 | 0.15 |
| comp. examp. 16 | 0.007 | 0.15 | 0.10 | — | — | 0.2 | 22.00 | 2.00 | — | 0.95 | 0.20 | 0.35 |
| comp. examp. 13 JIS SUS444 | <0.025 | <1.00 | <1.00 | <0.040 | <0.030 | — | 17.00~20.00 | 1.75~2.50 | <0.025 | — | — | — |
| comp. examp. 14 JIS SUS316 | <0.080 | <1.00 | <2.00 | <0.045 | <0.030 | 10.00~14.00 | 16.00~18.00 | 2.00~3.00 | — | — | — | — |

However, if niobium, titanium and copper are added in smaller amounts, the pitting potential of the stainless steel is not enough for the potential of the cathode active material, thus causing pitting. On the other hand, if niobium, titanium and copper are added in larger amounts, inclusions and precipitates of additives contained in the stainless steel stock are easily separated and formed thus deteriorating resistance to pitting, and further by the influence of niobium, formation of ferrite is promoted to make the steel stock rigid and hardly processed.

In these examples, an electricity-generating element comprising the cathode and anode wound via the separator was used. However, the same effect could be achieved even by use of an electricity-generating element comprising cathodes and anodes laminated via a separator or an electricity generating element comprising a cathode and an anode bent alternately via a separator.

Now, the examples wherein a metal net is provided between the cathode or anode cases and the electrode group in the present invention are described.

Example 22

Figure 6:
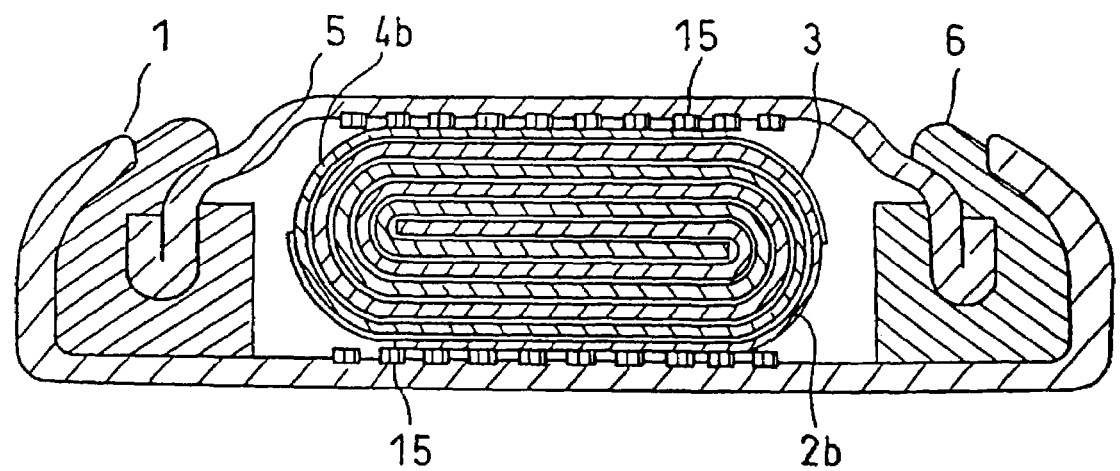
FIG. 6. Sectional drawing of a cell with a metal net.

A sectional drawing of the cell in this example is shown in FIG. 6. In the same cell as in Example 5, a stainless steel metal net 6 of 0.03 mm in thickness was welded into the internal surfaces of the cathode and anode cases. The other procedure was the same as in Example 5. The total thickness of the cathode and anode cases and the metal net was 0.28 mm.

Example 23

A cell was prepared in the same manner as in Example 22 except that a metal net of 0.05 mm in thickness was welded into the internal surfaces of the cathode and anode cases, and the total thickness of the cathode and anode cases and the metal net was 0.30 mm.

Example 24

A cell was prepared in the same manner as in Example 22 except that a metal net of 0.10 mm in thickness was welded into the internal surfaces of the cathode and anode cases, and the total thickness of the cathode and anode cases and the metal net was 0.35 mm.

Example 25

A cell was prepared in the same manner as in Example 22 except that a metal net of 0.15 mm in thickness was welded into the internal surfaces of the cathode and anode cases, and the total thickness of the cathode and anode cases and the metal net was 0.40 mm.

Example 26

A cell was prepared in the same manner as in Example 22 except that a metal net of 0.20 mm in thickness was welded into the internal surfaces of the cathode and anode cases, and the total thickness of the cathode and anode cases and the metal net was 0.45 mm.

Example 27

A cell was prepared in the same manner as in Example 22 except that a metal net of 0.30 mm in thickness was welded into the internal surfaces of the cathode and anode cases, and the total thickness of the cathode and anode cases and the metal net was 0.55 mm.

Comparative Example 17

A cell was prepared in the same manner as in Example 22 except that the metal net was not used, and the cathode and anode cases having a conductive coating applied onto the internal surface of a cell case of 0.25 mm in thickness were used.

A stainless steel lead terminal of 0.2 mm in thickness was resistance-welded at a welding power of 480±10V into each of cathode and anode cases in 300 cells thus constructed in the Examples and Comparative Examples. Fifty cells were picked up at random, dismantled, and examined for generation of holes and shrinkage in the separator at the sides of the cathode and anode, and the degree of removal of the electrodes. In addition, these cells were initially charged for 48 hours at a constant current of 3 mA at a constant voltage of 4.2 V, then left for 3 days at room temperature, and measured for the voltage in the open circuit. Thereafter, the cells in which the voltage in the open circuit after 3 days was 4.0 V or more were discharged at a constant current of 1 mA until 3.0 V, to determine their discharge capacity.

The generation of holes and shrinkage in the separator at the sides of the cathode and anode, and the degree of removal of the electrodes are shown in Table 12. Further, the number of the cells whose voltage was less than 4.0 V in the open circuit after the cells were left for 3 days after initial charge, as well as the mean discharge capacity of the cells 3 days later wherein the voltage in the open circuit was 4.0 V or more, is shown in Table 13.

As is evident from the table, the cells of this invention in the Examples, as compared with the cell in Comparative Example 17, attain significant improvements against the generation of holes and shrinkage in the separator at the sides of the cathode and anode, and the removal of the electrodes, after the lead wire was resistance-welded into the cell, and the short-circuiting of the cells was also improved. In the Examples wherein the total thickness of the cathode and anode cases and the metal net was 0.30 mm or more, generation of holes and shrinkage in the separator at the sides of the cathode and anode, and removal of the electrodes are hardly observed after the lead terminal was resistance-welded into the cell. The cell in Example 22 showed slight shrinkage of the separator at the sides of the cathode and anode after resistance welding, but no short-circuiting occurred in the cell. In the cells in Examples 23, 24, 25 and 26, the thickness of the metal net is optimum so that a lot of electrodes can be packed in cells to give high-capacity cells. Accordingly, the total of the thickness of each of the cathode and anode cases and the thickness of the metal net is more preferably 0.30 mm to 0.45 mm.

TABLE 12

| | total thickness of the case and the metal net (mm) | the ratio of accidental generation in the separator or the electrode | | |
|---|---|---|---|---|
| | | generation of holes in the separator | shrinkage in the separator | removal in the electrodes |
| comp. examp. 17 | no net 0.25 | 50/50 | 50/50 | 50/50 |
| example 22 | 0.28 | 0/50 | 2/50 | 0/50 |

TABLE 12-continued

|  | total thickness of the case and the metal net (mm) | the ratio of accidental generation in the separator or the electrode | | |
| --- | --- | --- | --- | --- |
|  |  | generation of holes in the separator | shrinkage in the separator | removal in the electrodes |
| example 23 | 0.30 | 0/50 | 0/50 | 0/50 |
| example 24 | 0.35 | 0/50 | 0/50 | 0/50 |
| example 25 | 0.40 | 0/50 | 0/50 | 0/50 |
| example 26 | 0.45 | 0/50 | 0/50 | 0/50 |
| example 27 | 0.55 | 0/50 | 0/50 | 0/50 |

TABLE 13

|  | total thickness of the case and the metal net (mm) | number of the cells having the voltage in the open curcuit less than 4.0 V 3 days after initial charge | discharge capacity (mAh) |
| --- | --- | --- | --- |
| comp. examp. 17 | no net 0.25 | 50/50 | 18 |
| example 22 | 0.28 | 0/50 | 73 |
| example 23 | 0.30 | 0/50 | 73 |
| example 24 | 0.35 | 0/50 | 71 |
| example 25 | 0.40 | 0/50 | 69 |
| example 26 | 0.45 | 0/50 | 67 |
| example 27 | 0.55 | 0/50 | 63 |

Now, the examples wherein a non-metallic thermal insulator is provided between the cathode or anode case and the separator in the present invention are described.

Example 28

Figure 7:
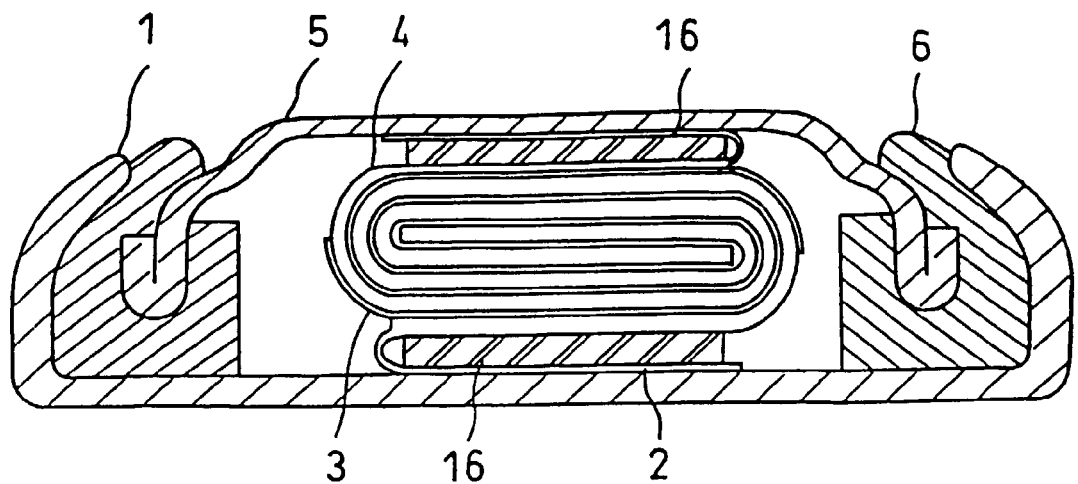
FIG. 7. Sectional drawing of cell containing non-metallic thermal insulator.
Figure 8:
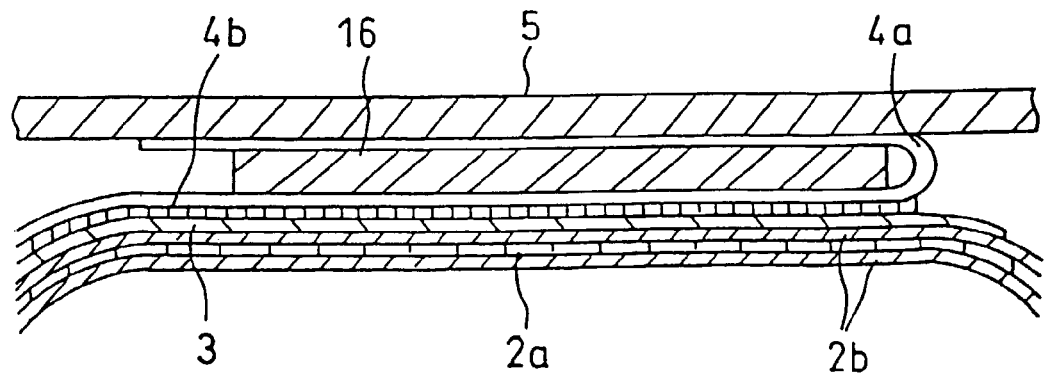
FIG. 8. Sectional drawing of cell containing non-metallic thermal insulator.

Sectional drawings of the cell in this example are shown in FIGS. 7 and 8. As shown in these drawings, the same electrode group as in Example 5 above was constructed, and a part of 100 mm from the edge and on one side of the electrode was used as an electrically connecting part. Hence, the anode active material-containing layer 4b was removed, and further the anode active material-containing layer 4b on a region of 22 mm from the edge of the back of said electrode was removed to provide an anode plate 4. As shown in the drawings, a glass tape of 0.03 mm in thickness was attached as thermal insulator 16 onto the region of 22 mm from which the anode active material-containing layer on the anode plate 4 had been removed. This glass tape was prepared by coating one side of a glass cloth of 11 mm in length and 16 mm in width as the substrate with an adhesive material. The thermal insulator 16 was attached also on a cathode plate 2 in the same manner. The same procedure as in Example 5 was conducted except for the above procedure. In these drawings, 2 indicates a cathode plate, 2a indicates a cathode current collecting body, 2b indicates a cathode active material containing layer and 4a indicates an anode current collecting body.

Example 29

A cell was constructed in the same manner as in Example 28 except that a glass tape of 0.05 mm in thickness was attached to each of the cathode and anode plates.

Example 30

A cell was constructed in the same manner as in Example 28 except that the thickness of the active material-containing layer on each of the cathode and anode was 0.14 mm, and a glass tape of 0.10 mm in thickness was attached to each of the cathode and anode plates.

Example 31

A cell was constructed in the same manner as in Example 28 except that the thickness of the active material-containing layer on each of the cathode and anode was 0.13 mm, and a glass tape of 0.15 mm in thickness was attached to each of the cathode and anode plates.

Example 32

A cell was constructed in the same manner as in Example 28 except that the thickness of the active material-containing layer on each of the cathode and anode was 0.12 mm, and a glass tape of 0.20 mm in thickness was attached to each of the cathode and anode plates.

Example 33

A cell was constructed in the same manner as in Example 28 except that the thickness of the active material-containing layer on each of the cathode and anode was 0.10 mm, and a glass tape of 0.30 mm in thickness was attached to each of the cathode and anode plates.

Example 34

A cell was constructed in the same manner as in Example 28 except that a PTFE tape prepared by coating one side of a PTFE tape of 0.03 mm in thickness with an adhesive was attached to each of the cathode and anode plates.

Example 35

A cell was constructed in the same manner as in Example 28 except that a PTFE tape of 0.05 mm in thickness was attached to each of the cathode and anode plates.

Example 36

A cell was constructed in the same manner as in Example 28 except that the thickness of the active material-containing layer on each of the cathode and anode was 0.14 mm, and a PTFE tape of 0.10 mm in thickness was attached to each of the cathode and anode plates.

Example 37

A cell was constructed in the same manner as in Example 28 except that the thickness of the active material-containing layer on each of the cathode and anode was 0.13 mm, and a PTFE tape of 0.15 mm in thickness was attached to each of the cathode and anode plates.

Example 38

A cell was constructed in the same manner as in Example 28 except that the thickness of the active material-containing layer on each of the cathode and anode was 0.12 mm, and a PTFE tape of 0.20 mm in thickness was attached to each of the cathode and anode plates.

Example 39

A cell was constructed in the same manner as in Example 28 except that the thickness of the active material-containing layer on each of the cathode and anode was 0.10 mm, and a PTFE tape of 0.30 mm in thickness was attached to each of the cathode and anode plates.

Comparative Example 18

A cell was constructed in the same manner as in Example 28 except that no thermal insulator was attached to the cathode and anode plates.

A stainless steel lead terminal of 0.2 mm in thickness was welded by resistance welding at an output voltage of 480±10 V into each of the cathode and anode cell cases in 300 cells thus constructed in each of the Examples and Comparative Examples. Fifty cells were picked up at random, dismantled, and examined for generation of holes and shrinkage in the separator at the sides of the cathode and anode, and the degree of removal of the electrodes. Fifty cells in each example were picked up at random from the remaining cells, charged initially for 48 hours at a constant current of 3 mA at a constant voltage of 4.2 V, left for 3 days at room temperature, and measured for the voltage in the open circuit. Thereafter, the cells in which said voltage in the open circuit was 4.0 V or more were selected and discharged at a constant current of 1 mA until 3.0 V, to determine their discharge capacity.

The generation of holes and shrinkage in the separator, and the degree of removal of the electrodes in the cells in the Examples and Comparative Examples, the number of cells wherein the voltage in the open circuit was less than 4.0 V after left for 3 days, and the mean discharge voltage thereafter, are shown in Table 14.

TABLE 14

| | | | the ratio of accidental generation in the separator or the electrode | | | number of the cells | |
| --- | --- | --- | --- | --- | --- | --- | --- |
| | material of thermal insulator | thickness of thermal insulator (mm) | generation of holes in the separator | shrinkage in the separator | removal in the electrodes | having the voltage in the open circuit less than 4.0 V 3 days after initial charge | discharge capacity (mAh) |
| comp. examp. 18 | — | none | 50/50 | 50/50 | 50/50 | 50 | — |
| example 28 | glass tape | 0.01 | 0/50 | 2/50 | 2/50 | 3 | 67 |
| example 29 | | 0.05 | 0/50 | 0/50 | 1/50 | 0 | 67 |
| example 30 | | 0.10 | 0/50 | 0/50 | 0/50 | 0 | 65 |
| example 31 | | 0.15 | 0/50 | 0/50 | 0/50 | 0 | 63 |
| example 32 | | 0.20 | 0/50 | 0/50 | 0/50 | 0 | 61 |
| example 33 | | 0.30 | 0/50 | 0/50 | 0/50 | 0 | 57 |
| example 34 | PTFE | 0.01 | 0/50 | 2/50 | 4/50 | 3 | 67 |
| example 35 | | 0.05 | 0/50 | 0/50 | 1/50 | 0 | 67 |
| example 36 | | 0.10 | 0/50 | 0/50 | 0/50 | 0 | 65 |
| example 37 | | 0.15 | 0/50 | 0/50 | 0/50 | 0 | 63 |
| example 38 | | 0.20 | 0/50 | 0/50 | 0/50 | 0 | 61 |
| example 39 | | 0.30 | 0/50 | 0/50 | 0/50 | 0 | 57 |

Examples, as compared with the cell in Comparative Example 18, attain significant improvements against the generation of holes and shrinkage in the separator at the sides of the cathode and anode, and the removal of the electrodes, after the lead wire was resistance-welded into the cell, and further the short-circuiting in the cells was inhibited, and the number of the cells showing a reduction in the voltage in the open circuit was decreased. In Examples 29 to 33 and Examples 35 to 39 wherein the thickness of the thermal insulator, that is, a glass tape or a PTFE tape of fluorine resin, is 0.05 mm or more, generation of holes and shrinkage in the separator at the sides of the cathode and anode, removal of the electrodes and a reduction in the voltage in the open circuit are hardly observed after the lead terminal was resistance-welded into the cell. In the cells in Examples 29 to 32 and Examples 35 to 38, the thickness of the thermal insulator is optimum so that a lot of active materials can be packed in cells to give high-capacity cells.

In the Examples of the invention, the cells wherein glass or PTFE was used as the substrate material for the non-metal thermal insulator, but the same effect can be achieved even when FEP, ETFE, PFA, PVDF, polyimide, LCP, PPS, or PBT was used as the substrate material. Further, the flat non-aqueous solvent secondary cells wherein a non-aqueous solvent was used as the non-aqueous electrolyte has been described in the Examples of this invention, but these examples can be applied to polymer secondary cells using a polymer electrolyte as the non-aqueous electrolyte or solid electrolyte secondary cells using a solid electrolyte. Further, these examples are useful for cells wherein a polymer thin film or solid electrolyte film damaged easily by heat during welding has been used in place of the resin separator. The cells described above are mainly coin-shaped wherein the opening was sealed by caulking the cathode case, but the cathode and anode may be exchanged so that the opening of the anode case is sealed by caulking. Further, the shape of the cell may not be necessarily round, and the present invention can also be applied to flat non-aqueous electrolyte secondary cells of unique elliptic or rectangular shape.

Now, the examples where a cutting is provided in the cathode case in the present invention are described

Example 40

Figure 9:
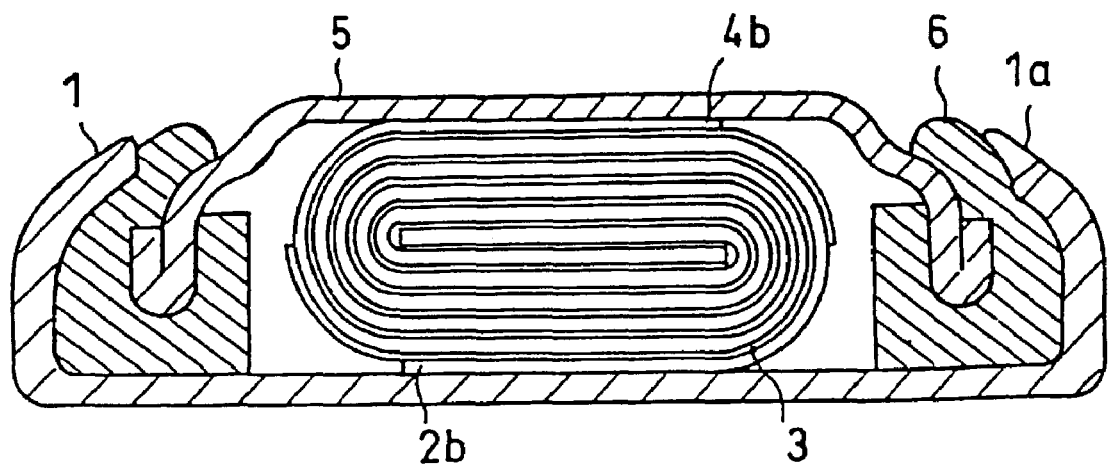
FIG. 9. Cathode case with cutting.
Figure 10:
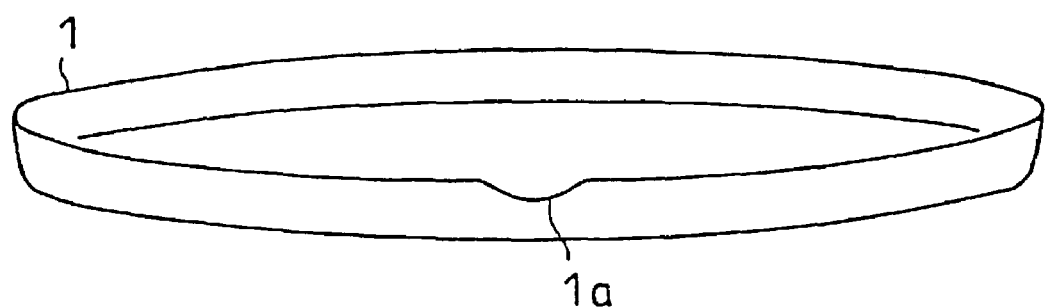
FIG. 10. Cathode case with cutting.

A sectional drawing of the cell in this example is shown in FIG. 9, and its cathode case is shown in FIG. 10.

A flat non-aqueous electrolyte secondary cell was prepared in the same manner as in Example 5 except that the cathode case 1 had a height of 3 cm and a diameter of 24.5 mm, and as shown in FIGS. 9 and 10, the cathode case was provided with the cut part 1a, and the dimension of the cut part 1a had a width of 0.1 grad in terms of its central angle to the circumference of the cathode case and a depth of 0.15 mm in depth. Further, the cathode case was sealed by caulking in the directions of diameter and height.

Example 41

A cell was prepared in the same manner as in Example 40 except that the cut part 1a provided in the cathode case 1 had a central angle of 0.1 πrad and a depth of 0.90 mm in depth.

Example 42

A cell was prepared in the same manner as in Example 40 except that the cut part 1a provided in the cathode case 1 had a central angle of 0.9 πrad and a depth of 0.15 mm in depth.

Example 43

A cell was prepared in the same manner as in Example 40 except that the cut part 1a provided in the cathode case 1 had a central angle of 0.9 πrad and a depth of 0.90 mm in depth.

Comparative Example 19

A cell was prepared in the same manner as in Example 40 except that no cutting was provided in the cathode case 1.

Comparative Example 20

A cell was prepared in the same manner as in Example 40 except that the cut part 1a provided in the cathode case 1 had a central angle of 0.1 πrad and a depth of 0.10 mm in depth.

Comparative Example 21

A cell was prepared in the same manner as in Example 40 except that the cut part 1a provided in the cathode case 1 had a central angle of 0.1 πrad and a depth of 0.95 mm in depth.

Comparative Example 22

A cell was prepared in the same manner as in Example 40 except that the cut part 1a provided in the cathode case 1 had a central angle of 0.05 πrad and a depth of 0.90 mm in depth.

Comparative Example 23

A cell was prepared in the same manner as in Example 40 except that the cut part 1a provided in the cathode case 1 had a central angle of 0.95 πrad and a depth of 0.15 mm in depth.

Comparative Example 24

A cell was prepared in the same manner as in Example 40 except that the cut part 1a provided in the cathode case 1 had a central angle of 0.1 πrad and a depth of 0.15 mm in depth, and the cathode case 1 was sealed by caulking in only the direction of diameter.

Fifty cells thus constructed in each example were initially charged for 48 hours at a constant current of 3 mA at a constant voltage of 4.2 V, and then stored for 100 days at 45° C. under 93% relative humidity, and the number of cells with electrolyte leakage was determined. Further, the cells were examined in a test where they were forcibly discharged at a constant current of 300 mAh for 6 hours, or in a test where they were heated at 160° C. for 10 minutes after heated at an increasing temperature of 5° C./min., and the number of broken cells was examined.

The test results are shown in Table 15. Electrolyte leakage did not occur during storage in the cells in the Examples and Comparative Examples 19, 20 and 22. On the other hand, in Comparative Example 21, the electrolyte was leaked through the cutting, because the cut part was too deep. Further, in Comparative Example 23, the width of the cutting was too broad, and thus in Comparative Example 24, the degree of compression of the insulating gasket could not be increased, thus deteriorating air-tightness to permit electrolyte leakage.

In the forcible discharge test and the heating test, the cells in the Examples and Comparative Examples 21, 23 and 24 were not broken, while the cells in Comparative Examples 19, 20 and 22 were broken because the cathode case could not be deformed, thus failing to open the insulating gasket.

TABLE 15

| | size of a cutting | | number of cells with | number of broken cells | |
|---|---|---|---|---|---|
| | | | | at the forcibly | at the |
| | width (rad) | depth (mm) | electrolyte leakage | discharge test | heating test |
| example 40 | 0.1 π | 0.15 | 0/30 | 0/10 | 0/10 |
| example 41 | 0.1 π | 0.90 | 0/30 | 0/10 | 0/10 |
| example 42 | 0.9 π | 0.15 | 0/30 | 0/10 | 0/10 |
| example 43 | 0.9 π | 0.90 | 0/30 | 0/10 | 0/10 |
| comp. examp. 19 | no cutting | | 0/30 | 0/10 | 0/10 |

TABLE 15-continued

| | size of a cutting | | number of cells with electrolyte leakage | number of broken cells | |
|---|---|---|---|---|---|
| | width (rad) | depth (mm) | | at the forcibly discharge test | at the heating test |
| comp. examp. 20 | 0.1 π | 0.10 | 0/30 | 0/10 | 0/10 |
| comp. examp. 21 | 0.1 π | 0.95 | 24/30 | 0/10 | 0/10 |
| comp. examp. 22 | 0.05 π | 0.90 | 0/30 | 0/10 | 0/10 |
| comp. examp. 23 | 0.95 π | 0.15 | 19/30 | 0/10 | 0/10 |
| comp. examp. 24 | 0.1 π | 0.15 | 29/30 | 0/10 | 0/10 |

As described above, the cutting in the cathode case is formed such that its width is 0.1 π to 0.9 πrad in terms of its central angle relative to the circumference of the cathode case and simultaneously its depth is 5 to 30% of the height of the cathode case, whereby a flat non-aqueous electrolyte secondary cell free of breakage under abnormal conditions and free of electrolyte leakage during storage can be provided.

In the above examples, the flat non-aqueous solvent secondary cells wherein a non-aqueous solvent was used as the non-aqueous electrolyte, but the same effect can also be achieved by a polymer secondary cell using a polymer electrolyte as the non-aqueous electrolyte or by a solid electrolyte secondary cell using a solid electrolyte. Further, a polymer thin film or a solid electrolyte film can also be used in place of the resin separator. The cell having a single cutting was described above, but the cell having a plurality of cuttings can also achieve the same effect if the width of cuttings in total has a central angle of 0.1 π to 0.9 πrad relative to the circumference of the cathode case. The cells described above are mainly coin-shaped electrolyte cells wherein the opening was sealed by caulking the cathode case, but the cathode and anode may be exchanged so that the anode case is provided with the cutting, and the opening of the anode case may be sealed by caulking.

Now, examples of flat non-aqueous electrolyte secondary cells wherein one or two grooves are formed on the sealed-opening portion R in the cathode case in the lengthwise direction to form a thin-plate part are described.

Example 44

Figure 11:
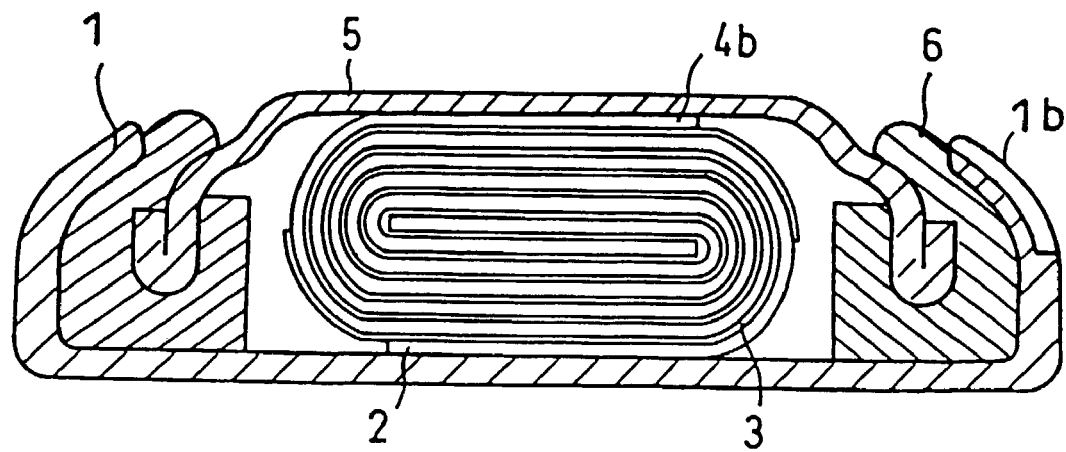
FIG. 11. Sectional drawing of flat non-aqueous electrolyte secondary cell with one or two grooves.
Figure 12:
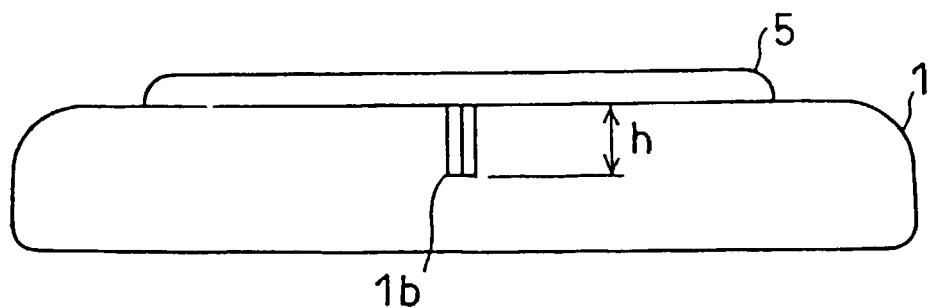
FIG. 12. Opening-sealed portion of cathode case with groove.
Figure 13:
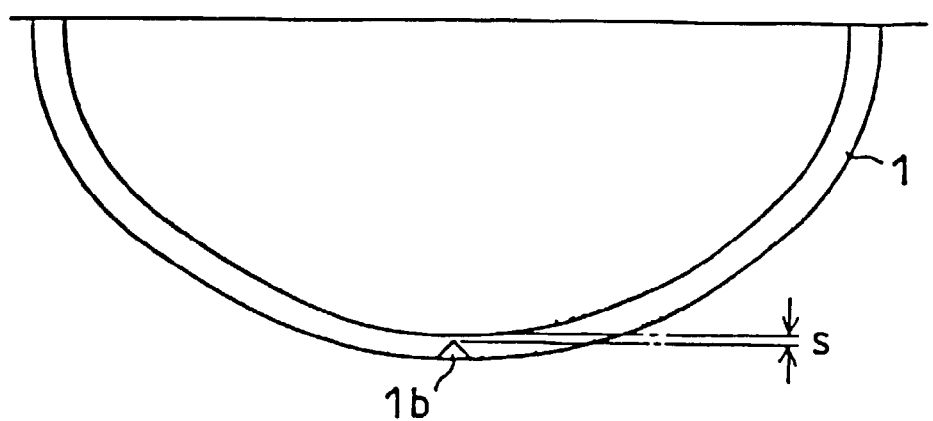
FIG. 13. Sectional drawing of cathode case.

This example is described by reference to FIGS. 11, 12 and 13. FIG. 11 is a sectional drawing of the cell in this example; FIG. 12 shows the opening-sealed portion R in the cathode case in FIG. 11; and FIG. 13 is a sectional drawing of the cathode case 1.

In the cathode case 1, the opening-sealed portion R is provided with one groove thin plate portion 1b. The cells were provided with one of 7 types of groove thin plate portion 1b having a thickness ranging by 0.02 mm from 0.05 mm to 0.17 mm. Ten cells provided with each type of portion 1b were initially charged for 48 hours at a constant current of 3 mA at a constant voltage of 4.2 V, and then examined in a test where they were forcibly discharged at a constant current of 300 mA for 6 hours, or in a test where they were heated at 160° C. for 10 minutes after heated at an increasing temperature of 5° C./min., and then the number of broken cells was examined. Further, 30 cells provided with each type of portion 1b were stored for 100 days at 45° C. under 93% relative humidity, and electrolyte leakage was examined.

Example 45

The secondary cell in Example 44 was provided with two portions 1b in the cathode vessel and then evaluated in the same manner as above.

The test results are shown in Table 16. When the thickness of portion 1b was 0.17 mm, the cells were broken to scatter the cell content without rupture of one or two portions 1b. When the thickness of portion 1b was 0.05 mm, electrolyte leakage occurred through one or two portions 1b, because the portion 1b was too thin thus causing rupture upon sealing of the opening, to deteriorate sealability of the opening.

TABLE 16

| | the cathode case | | | | | |
|---|---|---|---|---|---|---|
| | example 44 one thin plate portion | | | example 45 two thin plate portion | | |
| thickness of thin plate portion (mm) | at the forcibly discharge test | at the heating test | number of cells with electrolyte leakage | at the forcibly discharge test | at the heating test | number of cells with electrolyte leakage |
| 0.05 | 0/10 | 0/10 | 3/30 | 0/10 | 0/10 | 5/30 |
| 0.07 | 0/10 | 0/10 | 0/30 | 0/10 | 0/10 | 0/30 |
| 0.09 | 0/10 | 0/10 | 0/30 | 0/10 | 0/10 | 0/30 |
| 0.11 | 0/10 | 0/10 | 0/30 | 0/10 | 0/10 | 0/30 |
| 0.13 | 0/10 | 0/10 | 0/30 | 0/10 | 0/10 | 0/30 |
| 0.15 | 0/10 | 0/10 | 0/30 | 0/10 | 0/10 | 0/30 |
| 0.17 | 3/10 | 1/10 | 0/30 | 2/10 | 2/10 | 0/30 |

As can be seen from these results, the flat non-aqueous solvent secondary cell free of breakage and leakage can be obtained by allowing the thickness of the thin plate portion 1b to be in the range of 0.07 to 0.15 mm.

In Examples 44 and 45 in the present invention, the flat non-aqueous solvent secondary cells using a non-aqueous solvent as the non-aqueous electrolyte were described, but the same effect can be achieved by a polymer secondary cell using a polymer electrolyte as the non-aqueous electrolyte or by a solid electrolyte secondary cell using a solid electrolyte.

Now, the examples where a shattering groove having a concave shape in section is formed on the external surface of the anode case in the present invention are described.

Example 46

Figure 14:
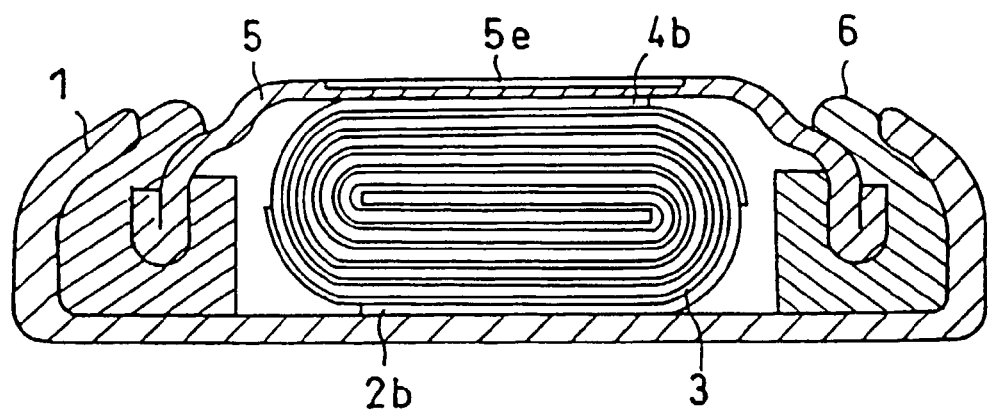
FIG. 14. Anode case with shattering groove.
Figure 15:
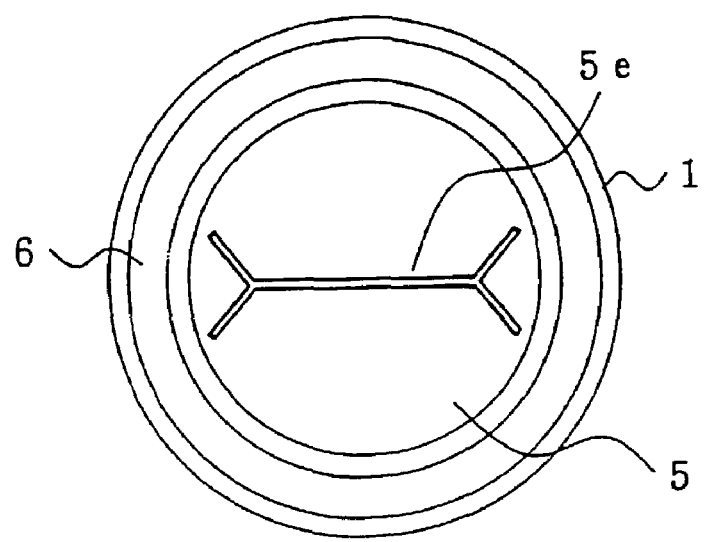
FIG. 15. Top view of anode case with shattering groove.

The anode case 5 in the cell in Example 5 above was provided with the shattering groove 5e having a concave shape in section, as shown in FIGS. 14 and 15. This shattering groove 5e is branched at the terminals thereof. FIG. 14 is a sectional drawing of the cell in this example, and FIG. 15 is a top view of the anode case in FIG. 14.

Example 47

Figure 16:
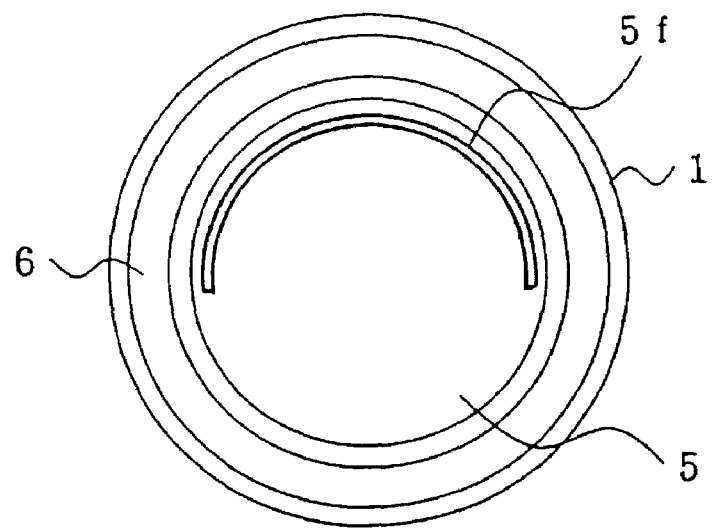
FIG. 16. Top view of anode case having shattering groove of concave shape.

In this example, the shape of the shattering groove is different from that of Example 46, and as shown in FIG. 16 (top view of the anode case), the shattering groove 5f having a concave shape in section has a half-round shape along the circumference in the bottom of the anode case 5.

Example 48

Figure 17:
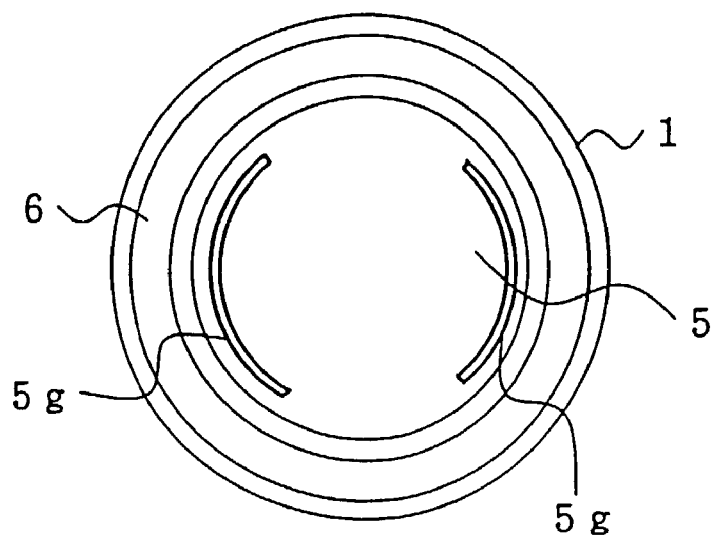
FIG. 17. Top view of anode case with shattering groove and circular shape.

As shown in FIG. 17 (top view of the anode case), the shattering groove 5g having a concave shape in section has a ¼ circular shape along the circumference in the bottom of the anode case 5, and two shattering grooves 5g face each other.

Example 49

Figure 18:
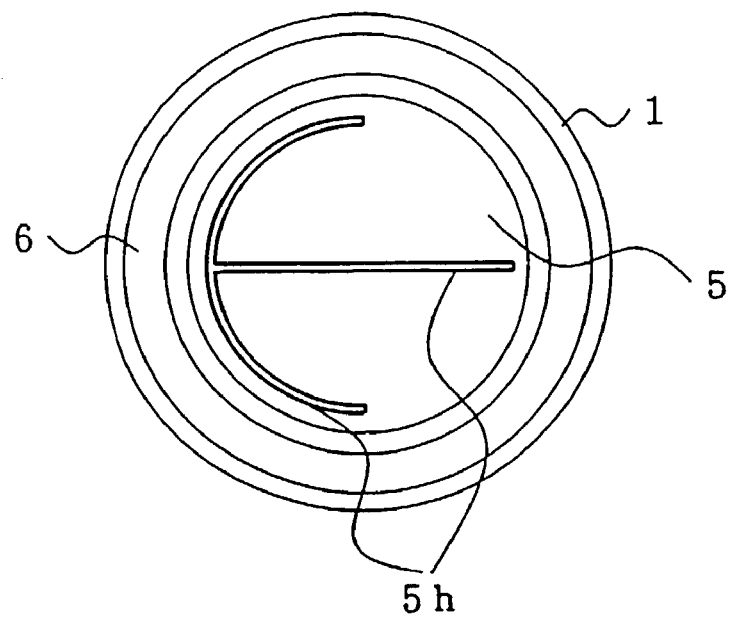
FIG. 18. Top view of anode case with half-round shattering groove along circumference.

In the shattering groove 5h having a concave shape in section as shown in FIG. 18 (top view of the anode case), a half-round shattering groove along the circumference in the bottom of the anode case 5 is connected in T form to one shattering groove.

Example 50

Figure 19:
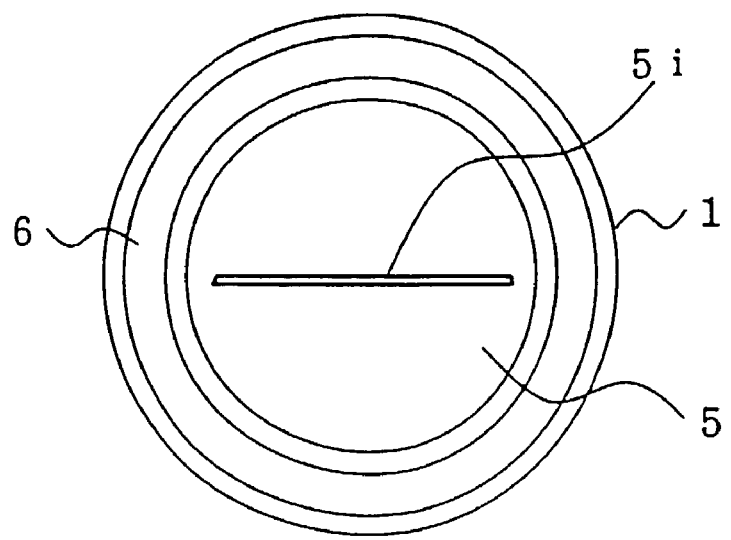
FIG. 19. Top view of anode case with linear section concave shaped groove.

As shown in FIG. 19 (top view of the anode case), the shattering groove 5i having a concave shape in section is linear.

Example 51

Figure 20:
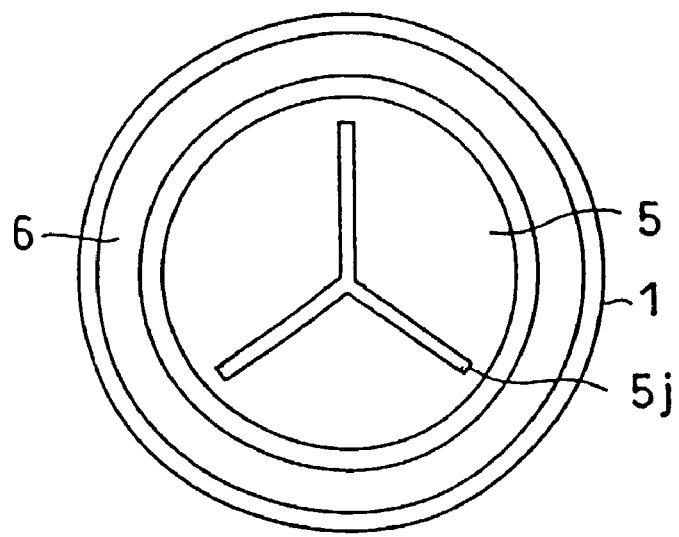
FIG. 20. Top view of anode case with shattering grooves gathered at central.

As shown in FIG. 20 (top view of the anode case), the shattering groove 5j having a concave shape in section has a shape such as 3 lines gathered at central.

Example 52

Figure 21:
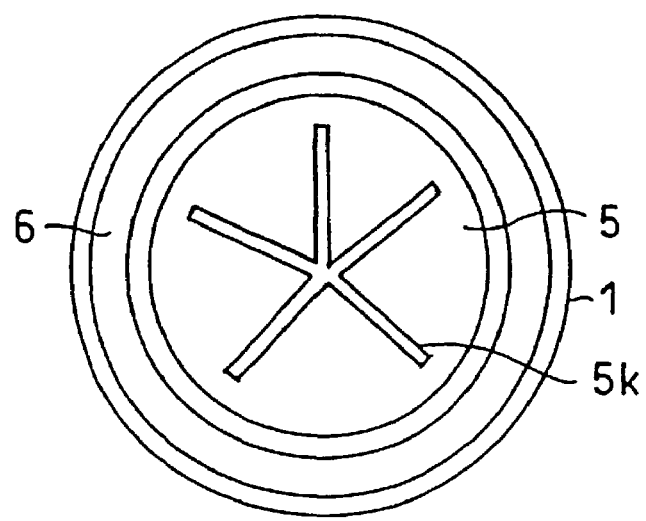
FIG. 21. Top view of anode case with five lines of shattering groove.

As shown in FIG. 21 (top view of the anode case), the shattering groove 5k having a concave shape in section has a shape such as 5 lines gathered at central.

Comparative Example 25

Figure 22:
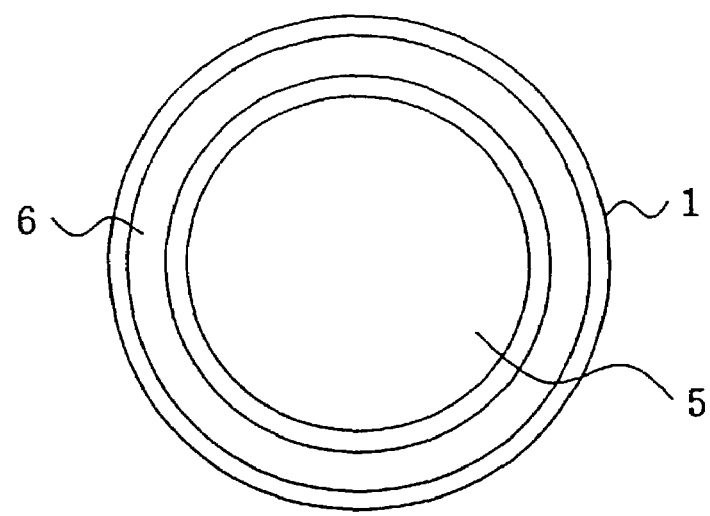
FIG. 22. Top view of anode case, cathode case having no shattering groove.

As shown in FIG. 22 (top view of the anode case), the cathode case 5 having no shattering groove was used.

Comparative Example 26

The cell in this example was the same as in Comparative Example 25 except that the cathode case 1 was provided with a shattering groove having the same shape as that of the shattering groove in Example 46.

Reference Example 5

A shattering groove having the same shape as in Example 46 is formed not on the external face of the anode case but on the internal face of the anode case.

Fifty cells in each group were initially charged for 48 hours at a constant current of 3 mA at a constant voltage of 4.2 V, and then stored for 100 days at 60° C. under 93% relative humidity, and the number of cells with electrolyte leakage was determined. Further, the cells were examined in a test where they were forcibly discharged at a constant current of 300 mAh for 6 hours, or in a test where they were heated at 160° C. for 10 minutes after heated at an increasing temperature of 5° C./min., and then the number of broken cells was determined. The test results are shown in Table 17.

TABLE 17

|  | | at the forcibly discharge test | | | at the heating test | | |
| --- | --- | --- | --- | --- | --- | --- | --- |
|  | number of cells with electrolyte leakage | number of broken cells | number of the effectly worked shattering groove | period untill shattering groove worked (hrs.) | number of broken cells | number of the effectly worked shattering groove | period untill shattering groove worked (min.) |
| example 46 | 0/30 | 0/10 | 10/10 | 5~5.5 | 0/10 | 10/10 | 25~32 |
| example 47 | 0/30 | 0/10 | 10/10 | 5~5.5 | 0/10 | 10/10 | 26~33 |
| example 48 | 0/30 | 0/10 | 10/10 | 5.2~5.7 | 0/10 | 10/10 | 31~36 |
| example 49 | 0/30 | 0/10 | 10/10 | 4.8~5.3 | 0/10 | 10/10 | 21~24 |
| example 50 | 0/30 | 0/10 | 10/10 | 5.2~5.6 | 0/10 | 10/10 | 26~33 |
| example 51 | 0/30 | 0/10 | 10/10 | 5.2~5.5 | 0/10 | 10/10 | 30~36 |
| example 52 | 0/30 | 0/10 | 10/10 | 5.0~5.4 | 0/10 | 10/10 | 29~34 |
| comp. examp. 25 | 0/30 | 10/10 | 10/10 | — | 10/10 | — | — |
| comp. examp. 26 | 21/30 | 0/10 | 10/10 | 5~5.5 | 0/10 | 10/10 | 25~32 |
| ref. examp. 5 | 0/30 | 0/10 | 10/10 | 5.3~5.9 | 1/10 | 9/10 | 31~37 |

As can be seen from Table 17, no electrolyte leakage occurred during storage in the cells in Comparative Example 25 and Reference Example 5. On the other hand, in Comparative Example 26, the cathode case was corroded during storage, and the electrolyte was leaked through a part of the shattering groove. Further, in Reference Example 5, one tenth of the cells were broken in the heating test. This is probably because the actuation of the shattering groove in the cell was delayed.

As shown in Table 17, a flat non-aqueous electrolyte secondary cell free of breakage under abnormal conditions and free of electrolyte leakage during storage can be obtained by providing it with one or more shattering grooves having a concave shape in section.

In the above examples, the flat non-aqueous electrolyte secondary cells using a non-aqueous solvent in the non-aqueous electrolyte were described, but the same effect can be achieved by a polymer secondary cell using a polymer electrolyte as the non-aqueous electrolyte or by a solid electrolyte secondary cell using a solid electrolyte. Further, a polymer thin film or a solid electrolyte film can also be used in place of the resin separator.

Now, the examples where unevenness or protrusions are provided in the inside of the cathode and anode cases in the present invention are described.

Example 53

Figure 23:
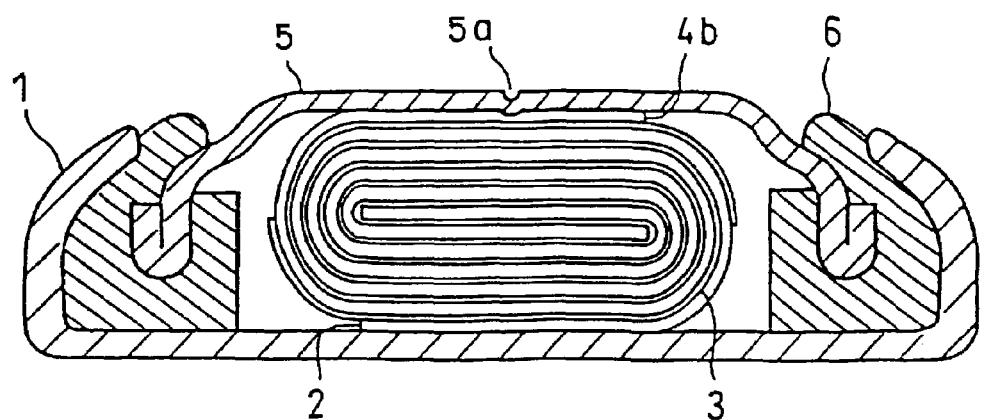
FIG. 23. Sectional drawing of cell with cathode or anode case having protrusions.
Figure 24:
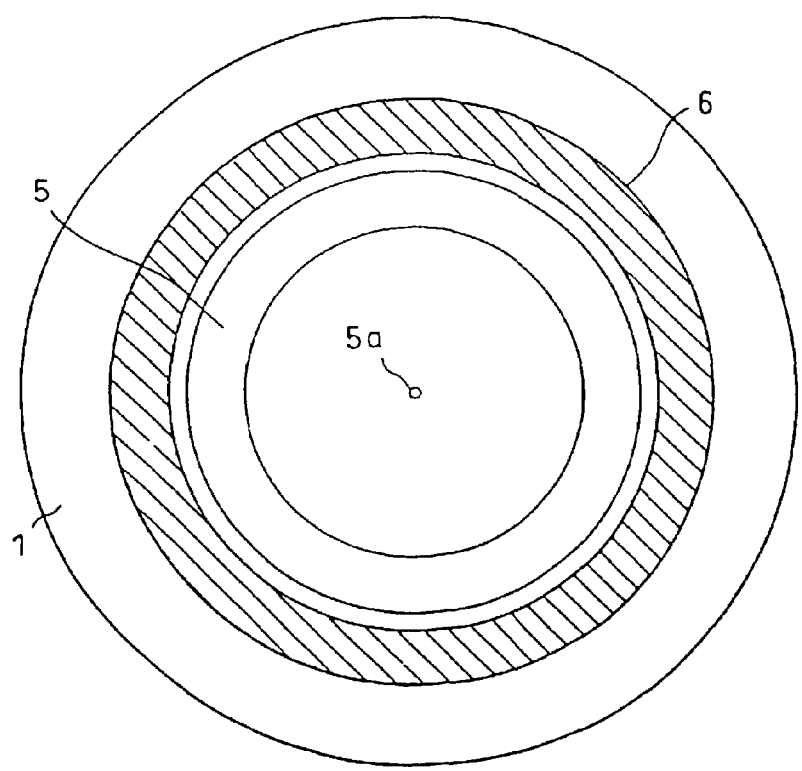
FIG. 24. Top view of cell having cathode and anode cases with protrusions.

A sectional drawing and a top view of the cell in this example are shown in FIGS. 23 and 24, respectively.

In the cell in Example 5, the anode case 5 is provided at the center thereof with a protrusion 5a of 1.0 mm in diameter and 0.2 mm in height in the direction of from the external to internal surfaces of the vessel. Fifty flat non-aqueous electrolyte secondary cells of 3 mm in thickness and 24.5 mm in diameter in Example 53 were constructed.

Example 54

Fifty cells were constructed in the same manner as in Example 53 except that the anode case was not provided with any protrusion, and the cathode case was provided at the center thereof with a protrusion 5a of 1.0 mm in diameter and 0.2 mm in height in the direction of from the external to internal surfaces of the vessel.

Example 55

Fifty cells were constructed in the same manner as in Example 53 except that the cathode cases were provided at the center thereof with a protrusion 5a of 1.0 mm in diameter and 0.2 mm in height in the direction of from the external to internal surfaces of the vessel.

Comparative Example 27

Fifty cells were constructed in the same manner as in Example 53 except that the protrusion-free anode case was used.

These cells were initially charged for 48 hours at a constant current of 3 mA at a constant voltage of 4.2 V Thereafter, the cells were discharged at a constant current of 30 mA until 3.0 V, to determine their initial discharge capacity. The test results are shown in Table 18. Furthermore, they were discharged at a constant current of 240 mA until 3.0V, to determine their heavy-loading discharge capacity. Then, utilization of heavy-loading discharge capacity to initial discharge capacity are shown in Table 18.

TABLE 18

| | protrusion in anode case | protrusion in cathode case | utilization of heavy-loading discharge capacity (%) |
|---|---|---|---|
| example 53 | exist | none | 65 |
| example 54 | none | exist | 65 |
| example 55 | exist | exist | 70 |
| comp. examp. 27 | none | none | 52 |

As is evident from this table, the cells in the Comparative Examples are inferior in discharge capacity to the cells in the Examples. This is because the electrodes are shrunk upon discharge so that the contact between the electrode group and the cell vessel is unstabilized to increase the internal resistance. By providing protrusions as shown in this example, the contact is secured and thus such a reduction in capacity does not occur.

Now, the example where the electrode group formed by bending alternately a cathode sheet and an anode sheet setting each other in a right angled position was used are described.

Example 56

Figure 25:
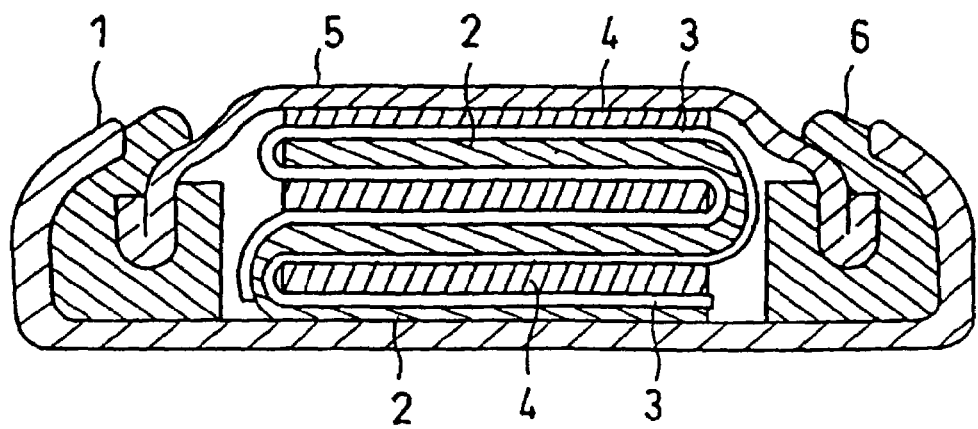
FIG. 25. Sectional drawing of cell with bent alternating cathode and anode sheet.
Figure 26:
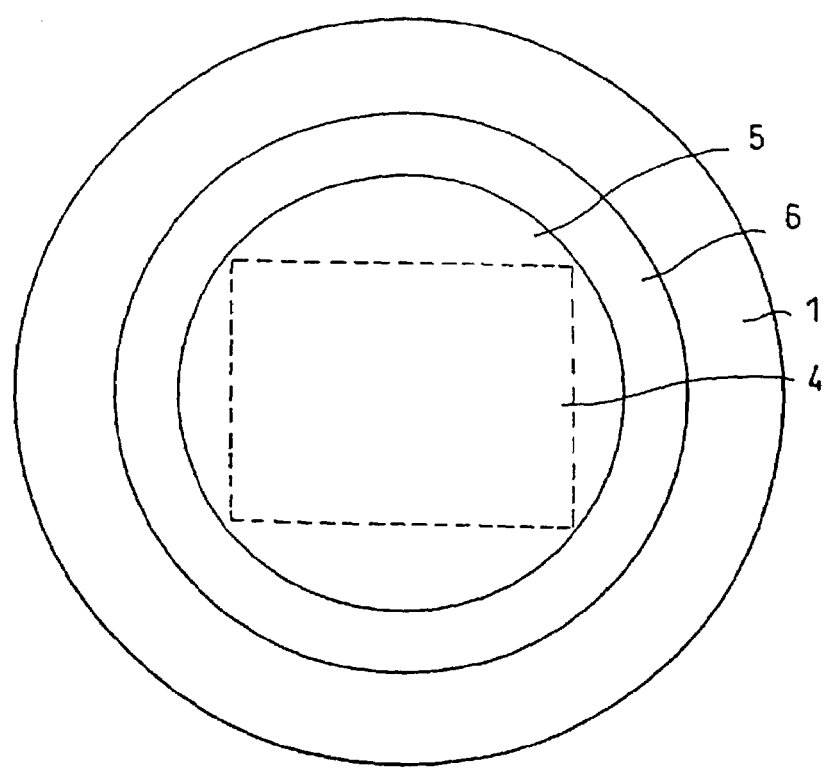
FIG. 26. Sectional drawing of cell having alternating cathode sheet and anode sheet.

Sectional drawings of the cell in this example are shown in FIGS. 25 and 26. As shown in these drawings, a cathode 2 in sheet shape is stuck with a separator 3 in lager sheet shape than a cathode 2 except for a part contacting at inner face of cathode case 1. An anode 4 in sheep shape was set on the above sheet cathode 2 in a right angled position each other. Thereafter, they were bent alternately to obtain needed capacity to form the electrode group. This electrode group were set in a cathode case via a gasket 6, an anode case 5 was set on the above electrode, then a cathode and anode cases were clipped by caulking. As shown these drawings, the thickness of the sheet cathode and anode was about half as their another portions.

In this example the electric capacity was increased by about 5% than that of the cells shown in FIG. 1 and FIG. 2. This is because the electrode group in this example is more effectively utilized than those cells in FIG. 1 and FIG. 2.

The invention claimed is:

1. A flat non-aqueous electrolyte secondary cell comprising a metallic anode case also serving as an anode terminal and a metallic cathode case also serving as a cathode terminal fit to each other via an insulating gasket, the anode or cathode case having an opening-sealed structure caulked by caulking and having in the inside thereof an electricity-generating element including at least a cathode, a separator and an anode and a non-aqueous electrolyte, wherein a plurality of electrode units each consisting of the cathode and the anode opposite to each other via the separator are laminated to form an electrode group, and the total sum of the areas of the opposing cathode and anode in this electrode group is larger than the area of the opening of said insulating gasket.

2. The flat non-aqueous electrolyte secondary cell according to claim 1, wherein at least 3 electrode units are laminated to form an electrode group.

3. The flat non-aqueous electrolyte secondary cell according to claim 1, wherein the cathode comprises a cathode plate having a cathode active material layer formed on one or both sides of a cathode current-collecting body, while the anode comprises an anode plate having an anode active material layer formed on one or both sides of an anode current-collecting body, and the thickness of the active material layer coated on one side of each of the cathode and anode current-collecting bodies is 0.03 mm to 0.40 mm.

4. The flat non-aqueous electrolyte secondary cell according to claim 1, wherein the cathode comprises a cathode plate having a cathode active material layer formed on one or both sides of a cathode current-collecting body, the anode comprises an anode plate having an anode active material layer formed on one or both sides of an anode current-collecting body, one terminal of each of the cathode and anode plates forms an electrically connecting part by exposing each current-collecting body, the electrically connecting portions of a plurality of cathode plates are exposed through the separator at the same side so as to be electrically connected to the cathode case, while the electrically connecting portions of a plurality of anode plates are exposed through the separator at the other side to said cathode plates, so as to be electrically connected to the anode case.

5. The flat non-aqueous electrolyte secondary cell according to claim 1, wherein a carbon material having a developed graphite structure wherein the distance of face $d_{002}$ is 0.338 nm or less is used as the anode, and a solution comprising lithium borofluoride as a supporting electrolyte dissolved in ethylene carbonate and γ-butyrolactone as major solvent is used as the non-aqueous electrolyte.

6. The flat non-aqueous electrolyte secondary cell according to claim 1, wherein the ratio by volume of ethylene carbonate to γ-butyrolactone is from 0.3 to 1.0.

7. The flat non-aqueous electrolyte secondary cell according to claim 1, wherein the concentration of the supporting electrolyte in the non-aqueous electrolyte is 1.3 to 1.8 mol/l.

8. The flat non-aqueous electrolyte secondary cell according to claim 1, wherein a metal net is provided between the cathode case and/or the anode case and the electrode group.

9. The flat non-aqueous electrolyte secondary cell according to claim 1, wherein a non-metal thermal insulator is provided between the cathode case and/or the anode case and the separator.

10. The flat non-aqueous electrolyte secondary cell according to claim 1, wherein the opening of the insulating gasket is sealed through caulking by compressing said cathode case in the directions of diameter and height, a cutting is provided in the side of the cathode case, and the width of the cutting is 0.1 π to 0.9 irrad in terms of central angle to the circumference of the cathode case, and the depth of the cutting is 5 to 30% of the height of the cathode case.

11. The flat non-aqueous electrolyte secondary cell according to claim 1, wherein the thickness of the thin-plate portion by groove processing is in the range of 0.07 mm to 0.15 mm.

12. The flat non-aqueous electrolyte secondary cell according to claim 1, wherein the anode case has at least one or more shattering grooves having a concave shape in section.

13. The flat non-aqueous electrolyte secondary cell according to claim 1, wherein the shattering grooves having a concave shape in section are formed on the external surface of the anode case.

* * * * *